(12) United States Patent
Kim et al.

(10) Patent No.: US 11,867,967 B2
(45) Date of Patent: Jan. 9, 2024

(54) CAMERA MODULE AND OPTICAL APPARATUS COMPRISING SAME

(71) Applicant: LG INNOTEK CO., LTD., Seoul (KR)

(72) Inventors: Dong Hyun Kim, Seoul (KR); Chul Ro Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 114 days.

(21) Appl. No.: 17/193,424

(22) Filed: Mar. 5, 2021

(65) Prior Publication Data

US 2021/0208359 A1 Jul. 8, 2021

Related U.S. Application Data

(63) Continuation of application No. 16/089,549, filed as application No. PCT/KR2017/003396 on Mar. 29, 2017, now Pat. No. 10,962,733.

(30) Foreign Application Priority Data

Mar. 30, 2016 (KR) .................. 10-2016-0038624
Mar. 30, 2016 (KR) .................. 10-2016-0038631
(Continued)

(51) Int. Cl.
 *G02B 27/12* (2006.01)
 *G02B 1/04* (2006.01)
 (Continued)

(52) U.S. Cl.
 CPC .............. *G02B 7/021* (2013.01); *G02B 3/00* (2013.01); *G02B 5/23* (2013.01); *G02B 7/02* (2013.01);
 (Continued)

(58) Field of Classification Search
 CPC . G02B 7/126; G02B 3/00; G02B 7/10; G02B 25/002; G02B 7/021; G02B 7/02;
 (Continued)

(56) References Cited

U.S. PATENT DOCUMENTS 5,157,554 A 10/1992 Kashihara
2005/0046740 A1 3/2005 Davis
(Continued)

FOREIGN PATENT DOCUMENTS

CN 1099871 A 3/1995
CN 102972018 A 3/2013
(Continued)

OTHER PUBLICATIONS

GSMArena Team, LG G5(LG at MWC 2016), In GSM Arena Website [Online], Feb. 20, 2016, Retrieved from the Internet: <URL: http://www.gsmarena.com/lg_mwc_2016-review-1382.php>, 16 pages.
(Continued)

*Primary Examiner* — Dawayne Pinkney
(74) *Attorney, Agent, or Firm* — Birch, Stewart, Kolasch & Birch, LLP

(57) ABSTRACT

An embodiment comprises: a lower surface; a first lens barrel comprising a first protrusion protruding from the lower surface; a first lens array comprising a plurality of first lenses disposed in the first lens barrel; a first holder comprising a first hole into which the first protrusion is inserted; a first adhesive member disposed between a lower surface of the first lens barrel around the first protrusion and an upper surface of the first holder around the first hole; and a first image sensor disposed under the first hole, wherein the first adhesive member comprises one end and the other end, which are disposed to encompass the first hole, and the one
(Continued)

end and the other end of the first adhesive member are spaced apart from each other.

15 Claims, 20 Drawing Sheets

(30) Foreign Application Priority Data

Mar. 30, 2016 (KR) ........................ 10-2016-0038649
Mar. 30, 2016 (KR) ........................ 10-2016-0038653

(51) Int. Cl.
*G02B 7/02* (2021.01)
*G02B 7/00* (2021.01)
*G02B 7/14* (2021.01)
*G03B 3/10* (2021.01)
*G02B 13/00* (2006.01)
*G02B 5/23* (2006.01)
*G02B 3/00* (2006.01)
*G02B 7/36* (2021.01)
*G03B 17/12* (2021.01)
*H04N 23/54* (2023.01)
*H04N 23/55* (2023.01)
*G02B 9/60* (2006.01)
*H04N 23/45* (2023.01)
*G02B 5/20* (2006.01)

(52) U.S. Cl.
CPC ............ *G02B 7/022* (2013.01); *G02B 7/025* (2013.01); *G02B 7/36* (2013.01); *G02B 9/60* (2013.01); *G02B 13/00* (2013.01); *G02B 13/001* (2013.01); *G03B 3/10* (2013.01); *G03B 17/12* (2013.01); *H04N 23/54* (2023.01); *H04N 23/55* (2023.01); *G02B 5/208* (2013.01); *G03B 2217/002* (2013.01); *H04N 23/45* (2023.01)

(58) Field of Classification Search
CPC .......... G02B 7/14; G02B 7/04; G11B 7/0932; H04N 5/2251; H04N 5/2253; G03B 17/14; G03B 21/53; G03B 21/14
USPC ................ 359/640, 642, 704, 808, 811–830; 353/100–101; 396/529–531; 348/373–374
See application file for complete search history.

(56) References Cited

U.S. PATENT DOCUMENTS

| | | |
|---|---|---|
| 2011/0037893 A1 | 2/2011 | Okada |
| 2012/0019940 A1* | 1/2012 | Lu ................. H01L 27/14618 359/819 |
| 2014/0184902 A1 | 7/2014 | Chen |
| 2015/0174715 A1 | 6/2015 | Kang |
| 2015/0205186 A1* | 7/2015 | Park ........................ G02B 7/026 348/373 |
| 2015/0301303 A1 | 10/2015 | Kim et al. |
| 2015/0326763 A1 | 11/2015 | Campbell et al. |
| 2015/0326766 A1 | 11/2015 | Czepowicz |

FOREIGN PATENT DOCUMENTS

| | | |
|---|---|---|
| CN | 104880802 A | 9/2015 |
| CN | 104969106 A | 10/2015 |
| DE | 41 15 878 A1 | 11/1991 |
| JP | 7-146430 A | 6/1995 |
| JP | 2010-050771 A | 3/2010 |
| JP | 2012-129976 A | 7/2012 |
| JP | 2014-225777 A | 12/2014 |
| KR | 10-2008-0069849 A | 7/2008 |
| KR | 10-2009-0087606 A | 8/2009 |
| KR | 10-2009-0110978 A | 10/2009 |
| KR | 10-2013-0040425 A | 4/2013 |
| KR | 20-2014-0000119 A | 1/2014 |
| KR | 10-1474221 B1 | 12/2014 |
| KR | 10-2015-0033077 A | 4/2015 |
| KR | 10-2015-0120735 A | 10/2015 |
| KR | 10-2016-0015880 A | 2/2016 |
| KR | 10-2016-0017448 A | 2/2016 |
| WO | WO 2005/032123 A1 | 4/2005 |
| WO | WO 2009/131017 A1 | 10/2009 |

OTHER PUBLICATIONS

Kim, Tae Jin, Closure of MWC 2016 which presented VR platform, In ZDNet Korea Website [Online], Feb. 25, 2016, Retrieved from the Internet: <URL: http://www.zdnet.co.kr/news/news_view.asp?artice_ id=20160225034706>, 5 pages.

* cited by examiner

CAMERA MODULE AND OPTICAL APPARATUS COMPRISING SAME

CROSS REFERENCE TO RELATED APPLICATIONS

This application is a Continuation of copending U.S. application Ser. No. 16/089,549, filed on Sep. 28, 2018, which is the National Phase of PCT International Application No. PCT/KR2017/003396, filed on Mar. 29, 2017, which claims priority under 35 U.S.C. 119(a) to Patent Application No. 10-2016-0038624, filed in the Republic of Korea on Mar. 30, 2016, Patent Application No. 10-2016-0038631, filed in the Republic of Korea on Mar. 30, 2016, Patent Application No. 10-2016-0038649, filed in the Republic of Korea on Mar. 30, 2016, and to Patent Application No. 10-2016-0038653, filed in the Republic of Korea on Mar. 30, 2016, all of which are hereby expressly incorporated by reference into the present application.

TECHNICAL FIELD

Embodiments relate to a camera module and an optical apparatus including the same.

BACKGROUND ART

A mobile communication terminal, a computer, a laptop computer, a vehicle, or the like is equipped with a camera which is capable of displaying video information of the surroundings or performing photographing or the like. As the thickness of a mobile communication terminal is reduced and a computer or a laptop computer is miniaturized, a compact, lightweight, and high quality camera has come to be required.

In particular, a camera used for an automobile or a surveillance camera (CCTV) requires a wide-angle optical system for obtaining surrounding image information in a wide range, and it is required to design a bright optical system that may easily distinguish an object to be photographed even in a dark environment.

Technical Object

Embodiments provide a camera module, which enables active alignment of a lens array unit and is capable of preventing the lens array unit from being out of focus due to the curing of a first adhesive member, and an optical apparatus including the camera module.

In addition, embodiments provide a camera module, which is capable of preventing separation of a lens array unit and preventing the lens array unit from being out of focus, and an optical apparatus including the camera module.

In addition, embodiments provide a camera module, which is capable of increasing the adhesive force between a circuit board and a holder and preventing breakage or warping of the holder due to impact, and an optical apparatus including the camera module.

In addition, embodiments provide a camera module, which is capable of suppressing distortion of an optical axis between a first imaging unit and a second imaging unit and improving the efficiency of dissipation of heat generated from an image sensor, and an optical apparatus including the camera module.

Technical Solution

A camera module according to an embodiment includes: a first lens barrel including a lower surface and a first protrusion protruding from the lower surface; a first lens array including a plurality of first lenses disposed in the first lens barrel; a first holder including a first hole into which the first protrusion is inserted; a first adhesive member disposed between a lower surface of the first lens barrel around the first protrusion and an upper surface of the first holder around the first hole; and a first image sensor disposed under the first hole, wherein the first adhesive member includes one end and a remaining end, which are disposed so as to surround the first hole, and the one end and the remaining end of the first adhesive member are spaced apart from each other.

An outer circumferential surface of the first protrusion inserted into the first hole and an inner circumferential surface of the first hole may be spaced apart from each other.

The first holder may include: a body portion accommodating the first image sensor therein; and a support portion protruding from an upper surface of the body portion, and the first hole may penetrate the body portion and the support portion, and the first adhesive member may be disposed on an upper surface of the support portion.

The first adhesive member may have a ring shape having an opening in a transverse direction between the one end and the remaining end thereof, which are spaced apart from each other.

The upper surface of the support portion may be disposed with a first groove, which is filled with a portion of the first adhesive member.

The camera module may further include a second adhesive member disposed in the opening in the first adhesive member between the first lens barrel and an upper surface of the support portion of the first holder.

The second adhesive member may be in contact with outer surfaces of the one end and the remaining end of the first adhesive member, and may be spaced apart from inner surfaces of the one end and the remaining end of the first adhesive member.

The camera module may include a retainer coupled to an upper end of the first lens barrel and configured to fix the first lens array.

The camera module may further include a reinforcement support portion disposed on the upper surface of the body portion so as to be in contact with the support portion, and the reinforcement support portion may protrude from the upper surface of the body portion, one end of the reinforcement support portion may come into contact with a side surface of the support portion, and the reinforcement support portion may protrude in a horizontal direction from the side surface of the support portion.

The camera module may further include: a first circuit board on which the first image sensor is disposed, the first circuit board being coupled to the first holder; an imaging unit including a second lens barrel having a second protrusion, a second lens array disposed in the second lens barrel, a second holder including a second hole into which the second protrusion is inserted, a third adhesive member disposed between a lower surface of the second lens barrel around the second protrusion and an upper surface of the second holder around the second hole, and a second image sensor disposed under the second hole; and a bracket configured to couple a lower surface of the first circuit board and a lower surface of a second circuit board to each other, wherein the bracket includes: a body including an upper surface coupled to the lower surface of the first circuit board, a lower surface coupled to the lower surface of the second circuit board, and a side surface located between the upper surface and the lower surface; and a guide portion having one end protruding upwards from the upper surface of the body and a remaining end protruding downwards from the lower surface of the body in order to guide the first circuit board, the first holder, the second circuit board, and the second holder.

The first groove may take the form of a ring disposed on the upper surface of the support portion around the hole.

A length of the second adhesive member in a direction perpendicular to a longitudinal direction thereof may be less than a length of the first adhesive member in a direction perpendicular to a longitudinal direction thereof.

A second groove may be disposed in the upper surface of the support portion of the first holder corresponding to the opening in the first adhesive member, and the second adhesive member may be disposed in the second groove and the opening in the first adhesive member between the first lens barrel and the upper surface of the support portion of the first holder.

One end of the second groove may be open to the first hole, and a remaining end of the second groove may be open to an outside of the side surface of the support portion.

The second adhesive member may be disposed closer to the remaining end than the one end of the second groove.

A part of the plurality of first lenses may be disposed inside the first protrusion.

The first adhesive member may be a UV-curable and thermosetting adhesive member.

The second adhesive member may be a UV-curable adhesive member.

A distance between the one end and the remaining end of the first adhesive member may gradually increase in a direction from an inner circumferential surface to an outer circumferential surface of the first adhesive member.

A camera module according to another embodiment includes: a lens barrel including a plurality of seating portions defining hollow regions having different diameters; a lens array including a plurality of lenses disposed on the plurality of seating portions; a holder including a body portion, a support portion protruding from the body portion, and a hole penetrating the body portion and the support portion, a lowermost seating portion among the plurality of seating portions being inserted into the hole; a first adhesive member disposed between a lower surface of the lens barrel around the lowermost seating portion and an upper surface of the holder; and an image sensor disposed under the hole, wherein one end and a remaining end of the first adhesive member, disposed on an upper surface of the support portion around the hole, are spaced apart from each other, and an outer circumferential surface of the lowermost seating portion inserted into the hole and an inner circumferential surface of the hole are spaced apart from each other.

The lens barrel may include a first seating portion defining a first hollow region having a first diameter; a second seating portion protruding from a lower surface of the first seating portion and defining a second hollow region having a second diameter; and a third seating portion protruding from a lower surface of the second seating portion and having a third diameter. The third seating portion may be inserted into the hole, and the first adhesive member may be disposed between the lower surface of the second seating portion and the upper surface of the support portion of the holder.

The first adhesive member may have an opening in a transverse direction.

A groove may be formed in the upper surface of the support portion of the holder corresponding to the opening in the first adhesive member, one end of the groove may be open to the hole, and a remaining end of the groove may be open to an outside of a side surface of the support portion.

The camera module may further include a second adhesive member disposed in the groove and the opening in the first adhesive member between the lower surface of the second seating portion and the upper surface of the support portion of the holder.

A camera module according to another embodiment includes: a lens barrel including a protrusion protruding from a center portion of a lower surface; a plurality of lenses disposed in the lens barrel; a holder including a hole into which the protrusion is inserted; a first adhesive member disposed between the lower surface of the lens barrel around the protrusion and an upper surface of the holder around the hole; and an image sensor disposed under the holder, wherein the first adhesive member takes the form of a ring having one end and a remaining end which are spaced apart from each other, an opening is disposed between the one end and the remaining end of the first adhesive member, one end of the opening is open to an inner circumferential surface of the first adhesive member, and a remaining end of the opening is open to an outer circumferential surface of the first adhesive member.

An optical apparatus according to an embodiment includes a display module including a plurality of pixels, the color of which changes in response to an electric signal; the camera module according to the above embodiments which convert an image input through a lens into an electric signal; and a controller configured to control the operation of the display module and the camera module.

A method of manufacturing a camera module according to an embodiment includes: coupling a lower surface of a holder and an upper surface of a circuit board, on which an image sensor is mounted, to each other; applying a first adhesive member to an upper surface of the holder; UV-curing the first adhesive member; seating a lens barrel so that a lower surface of the lens barrel comes into contact with the UV-cured first adhesive member; and thermally curing the first adhesive member in a state in which the lens barrel is seated, wherein one end and a remaining end of the first adhesive member are spaced apart from each other, and an opening is disposed between the one end and the remaining end of the first adhesive member so that a gas generated during UV curing or thermal curing of the adhesive member is discharged through the opening.

A camera module according to another embodiment includes a lens barrel including a plurality of seating portions defining hollow regions having different diameters and including a protrusion on a lower surface thereof; a lens array including a plurality of lenses disposed on the plurality of seating portions; a holder including a hole into which the protrusion is inserted; a first adhesive member disposed between the lower surface of the lens barrel around the protrusion and an upper surface of the holder around the hole; an image sensor disposed under the hole; and a retainer which is coupled to an upper end of the lens barrel and fixes the lens array, wherein an outer circumferential surface of the protrusion inserted into the hole and an inner circumferential surface of the hole are spaced apart from each other.

The retainer may be in contact with a first lens disposed on an uppermost seating portion.

The retainer may include: an engaging portion, which engages with an outer circumferential surface of the uppermost seating portion of the lens barrel; and a bent portion, which is bent from the engaging portion to support an edge of the first lens.

A screw thread for fastening may be formed in each of the uppermost seating portion of the lens barrel and the engaging portion.

The first lens may have the largest diameter among the plurality of lenses, and may have an upwardly convex exit surface.

An upper end of the bent portion may be located higher than an upper end of the lens barrel.

The exit surface of the first lens may protrude out of the bent portion.

The camera module may further include a reinforcement adhesive member disposed between the outer circumferential surface of the uppermost seating portion and the engaging portion.

A groove may be formed in an outer circumferential surface of the retainer, and the camera module may further include an O-ring disposed in the groove.

A camera module according to another embodiment includes: a lens barrel including a protrusion on a lower surface; a lens array including a plurality of lenses disposed in the lens barrel; a holder including a body portion, a support portion disposed on an upper surface of the body portion, and a hole penetrating the body portion and the support portion, into which the protrusion is inserted; a first adhesive member disposed between the lower surface of the lens barrel around the protrusion and an upper surface of the support portion around the hole; an image sensor disposed under the hole; and a reinforcement support portion disposed on the upper surface of the body portion so as to be in contact with the support portion, wherein an outer circumferential surface of the protrusion inserted into the hole and an inner circumferential surface of the hole are spaced apart from each other.

The reinforcement support portion may protrude from the upper surface of the body portion, and one end of the reinforcement support portion may be in contact with a side surface of the support portion.

The reinforcement support portion may include a plurality of reinforcement support portions spaced apart from each other, and the plurality of reinforcement support portions may be disposed so as to face each other in a direction parallel to a long side of the body portion.

A vertical distance from the upper surface of the body portion to an upper surface of the reinforcement support portion may be less than a vertical distance from the upper surface of the body portion to the upper surface of the support portion.

The reinforcement support portion may protrude in a horizontal direction from the side surface of the support portion.

The reinforcement support portion may be a single ring-shaped structure configured to surround the side surface of the support portion.

The camera module may further include a circuit board on which the image sensor is mounted, the circuit board being coupled to the body portion of the holder.

In addition, the camera module may further include a second adhesive member disposed on an edge of a lower surface of the body portion to bond the circuit board and the body portion to each other.

The camera module may further include a first reinforcement adhesive member having one end connected to a first area of the second adhesive member and a remaining end disposed on the lower surface of the body portion so as to extend in a direction parallel to a long side of the lower surface of the body portion.

A width of the first reinforcement adhesive member may be wider than a width of the second adhesive member.

The camera module may further include a second reinforcement adhesive member having one end connected to a second area of the second adhesive member and a remaining end extending in a direction parallel to a short side of the lower surface of the body portion so as to be connected to a third area of the second adhesive member.

The camera module may further include: a flexible substrate connected to the circuit board; and a third adhesive member configured to bond one end of the flexible substrate and a side surface of the body portion to each other.

The camera module may further include a filter located on the image sensor and disposed in a central area of the lower surface of the body portion, and the first reinforcement member and the second reinforcement adhesive member may be spaced apart from the filter.

A camera module according to a further embodiment includes: a first imaging unit; a second imaging unit; and a bracket configured to couple the first imaging unit and the second imaging unit to each other, wherein each of the first and second imaging units includes: a lens barrel having a protrusion on a lower surface; a lens array including a plurality of lenses disposed in the lens barrel; a holder including a hole into which the protrusion is inserted; a first adhesive member disposed between the lower surface of the lens barrel around the protrusion and an upper surface of the holder around the hole; and a circuit board on which the image sensor disposed under the hole is mounted, the circuit board being coupled to the holder, wherein an outer circumferential surface of the protrusion inserted into the hole is spaced apart from an inner circumferential surface of the hole, and wherein an upper surface of the bracket is coupled to a lower surface of the circuit board of the first imaging unit and a lower surface of the bracket is coupled to a lower surface of the circuit board of the second imaging unit.

The bracket may include: a body coupled to each of the first and second imaging units; and a guide portion connected to the body and configured to guide the circuit board and the holder of each of the first and second imaging units.

The guide portion may be in contact with a side surface of the body, one end of the guide portion may protrudes upwards from an upper surface of the body, and a remaining end of the guide portion may protrude downwards from a lower surface of the body.

The guide portion includes a plurality of guide portions spaced apart from each other, and each of the plurality of guide portions may be positioned so as to come into contact with a corresponding one of corners of the body.

Each of the plurality of guide portions may include a bent portion, which surrounds a corresponding one of the corners of the body.

A side surface of the circuit board and a side surface of the holder of each of the first and second imaging units may be in contact with an inner surface of each of the plurality of guide portions.

A lower surface of the holder of each of the first and second imaging units may be disposed with a coupling boss, the body may include a hole including a first opening, which is open to the upper surface of the body, and a second opening, which is open to the lower surface of the body, the coupling boss of the holder of the first imaging unit may pass through the circuit board of the first imaging unit to thereby be inserted into a first opening in the bracket, and the coupling boss of the holder of the second imaging unit may pass through the circuit board of the second imaging unit to thereby be inserted into a second opening in the bracket.

The circuit board may be a printed circuit board formed of an insulating plate and a copper foil, the circuit board may include a first area formed with a circuit pattern electrically connected to the image sensor and a second area, which is not electrically connected to the image sensor, the copper foil of the second area may be exposed to a lower surface of the insulating plate, the copper foil of the second area exposed to the lower surface of the insulating plate of the first imaging unit may be in contact with the upper surface of the bracket, and the copper foil of the second area exposed to the lower surface of the insulating plate of the second imaging unit may be in contact with the lower surface of the bracket.

The camera module may further includes a thermally conductive tape disposed between the upper surface of the bracket or the lower surface of the bracket and the copper foil of the second area exposed to the lower surface of the insulating plate of each of the first and second imaging units.

Advantageous Effects

Embodiments enable active alignment of a lens array unit and may prevent the lens array unit from being out of focus due to the curing of a first adhesive member.

In addition, embodiments may prevent separation of the lens array unit and may prevent the lens array unit from being out of focus.

In addition, embodiments may increase the adhesive force between a circuit board and a holder and may prevent breakage or warping of the holder due to impact.

In addition, embodiments may suppress distortion of an optical axis between a first imaging unit and a second imaging unit and may improve the efficiency of dissipation of heat generated from an image sensor.

DESCRIPTION OF DRAWINGS

FIG. 3b illustrates a cross-sectional view taken in the direction II-II' of FIG. 3a.

FIG. 3c illustrates a cross-sectional view of the lens barrel of FIG. 3a.

FIG. 3d illustrates a bottom perspective view of FIG. 3a.

MODE FOR INVENTION

Figure 1:
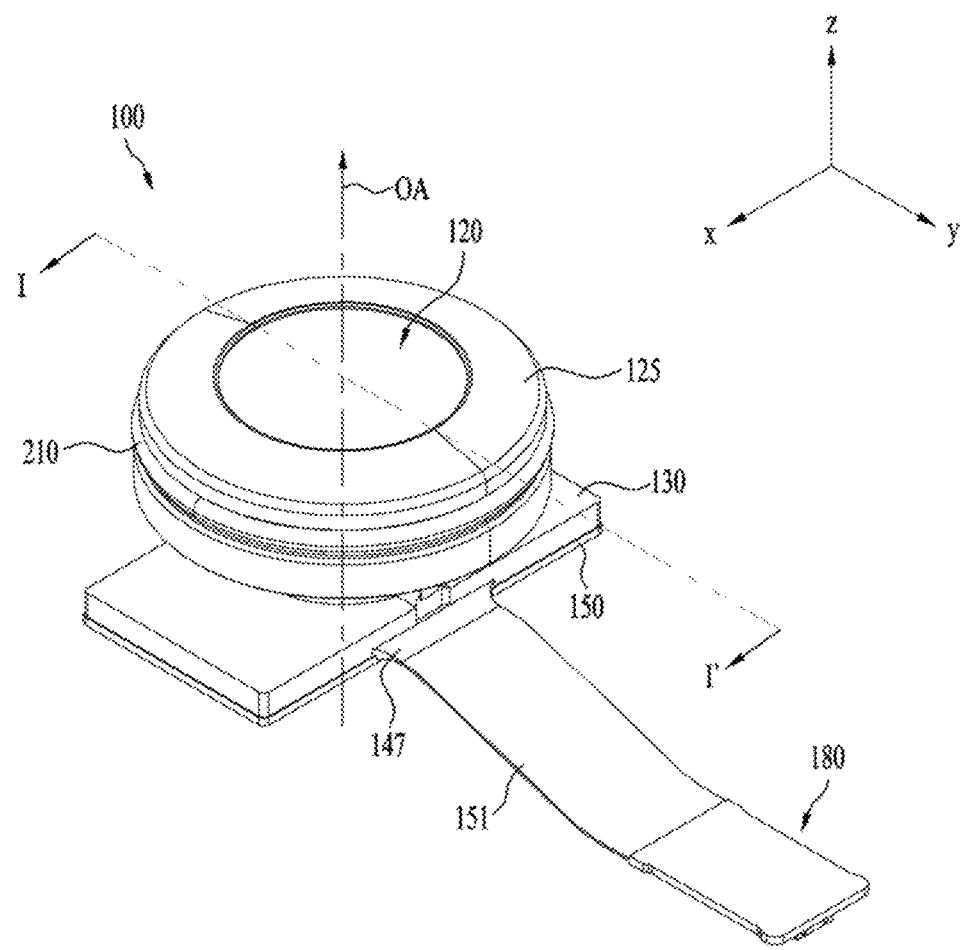
FIG. 1 illustrates a perspective view of a camera module according to an embodiment.

Hereinafter, the embodiments will become apparent through the accompanying drawings and a description related to the embodiments. In the description of the embodiments, it will be understood that, when an element such as a layer (film), region, pattern or structure is referred to as being formed "on" or "under" another element, such as a substrate, layer (film), region, pad or pattern, it can be directly "on" or "under" the other element or be indirectly formed with intervening elements therebetween. It will also be understood that "on" or "under" the element may be described relative to the drawings. In addition, the same reference numerals will be used throughout the drawings to refer to the same or like parts.

Hereinafter, a camera module and an optical apparatus including the same according to the embodiments will be described with reference to the accompanying drawings. For convenience of description, the camera module according to the embodiments will be described using the Cartesian coordinate system (x, y, z), but may be described using any other coordinate system, and the embodiments are not limited thereto. In each drawing, the x-axis and the y-axis are orthogonal to the z-axis which is an optical-axis direction. The z-axis direction which is the optical axis (OA) direction may be referred to as a "first direction", the x-axis direction may be referred to as a "second direction", and the y-axis direction may be referred to as a "third direction".

Figure 2:
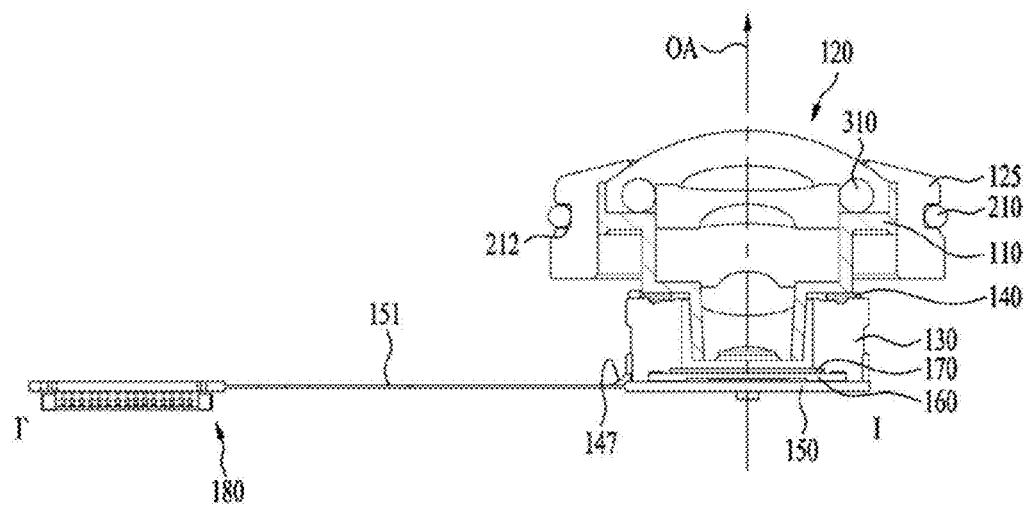
FIG. 2 illustrates a cross-sectional view of the camera module taken in the direction I-I' of FIG. 1.
Figure 3A:
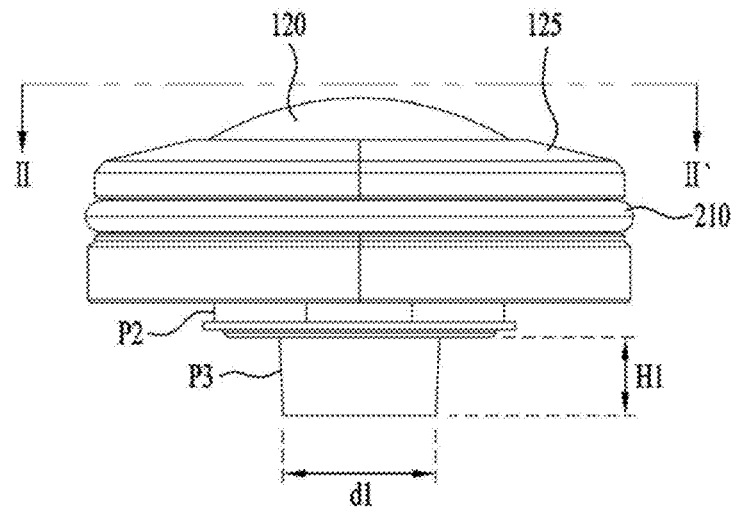
FIG. 3a illustrates an assembly perspective view of a lens array, a lens barrel, and a retainer of FIG. 1.
Figure 3B:
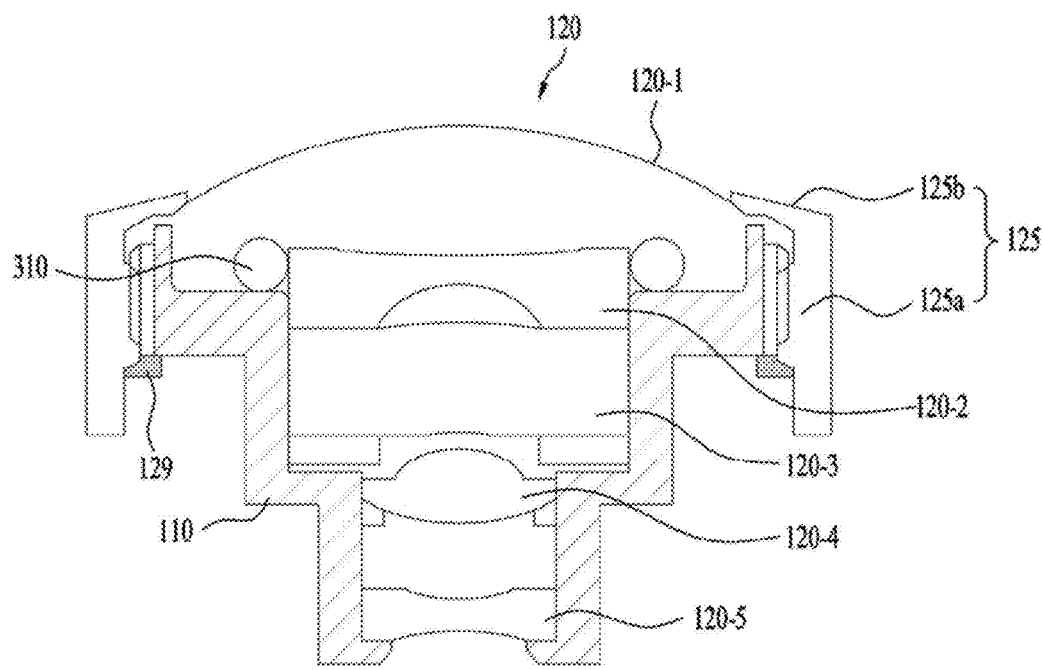
Figure 3C:
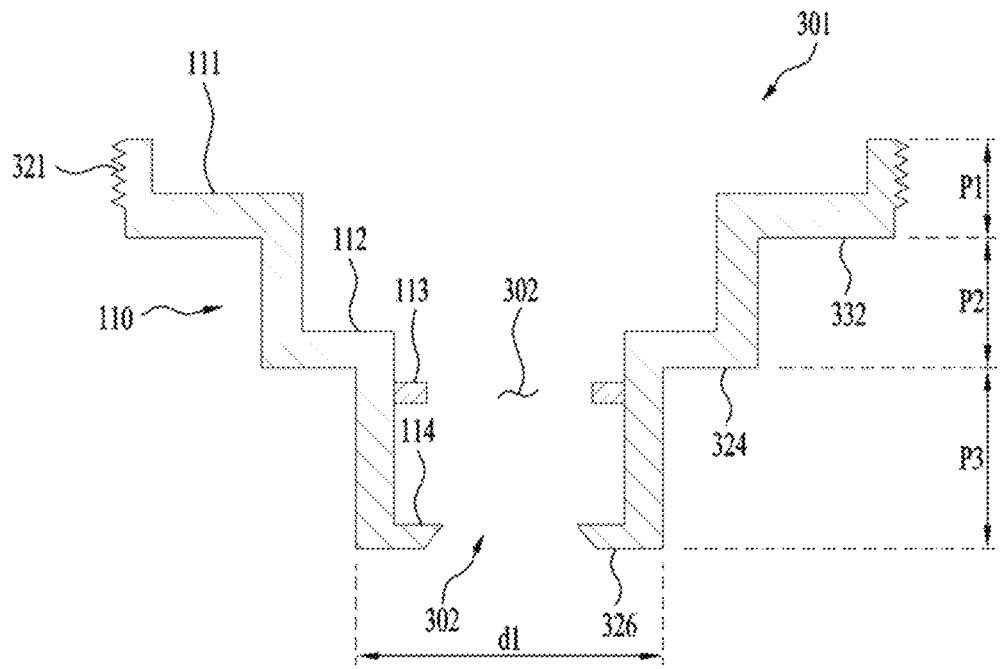
Figure 3D:
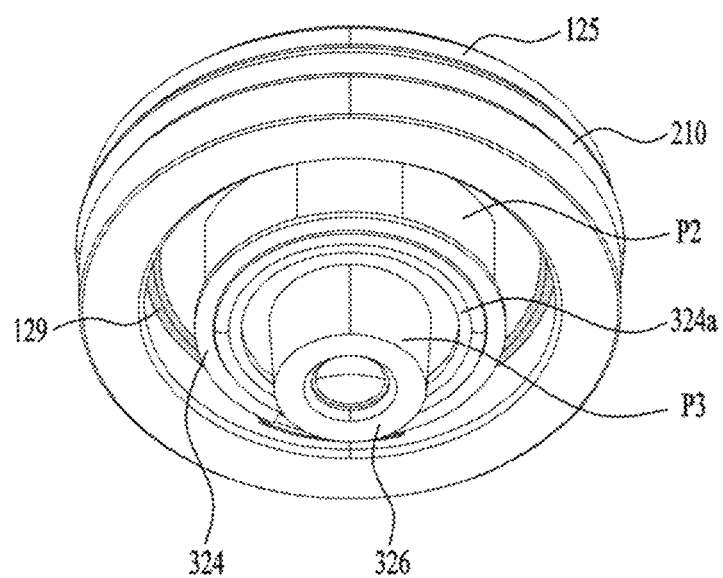

FIG. 1 illustrates a perspective view of a camera module 100 according to an embodiment, FIG. 2 illustrates a cross-sectional view of the camera module 100 taken in the direction I-I' of FIG. 1, FIG. 3a illustrates an assembly perspective view of a lens array 110, a lens barrel 120, and a retainer 125 of FIG. 1, FIG. 3b illustrates a cross-sectional view taken in the direction II-II' of FIG. 3a, FIG. 3c illustrates a cross-sectional view of the lens barrel 110 of FIG. 3a, and FIG. 3d illustrates a bottom perspective view of FIG. 3a.

Referring to FIGS. 1 and 3a to 3d, the camera module 100 includes the lens barrel 110, the lens array 120, the retainer 125, a holder 130, a first adhesive member 140, a circuit board 150, an image sensor 160, a filter 170, and a connector 180.

The lens array 120 is disposed or mounted in the lens barrel 110, and serves to concentrate external light on the image sensor 160.

The lens array 120 may include a plurality of lenses 120-1 to 120-5, and the plurality of lenses 120-1 to 120-5 may be arranged in a line within the lens barrel 120.

Referring to FIG. 3c, the lens barrel 110 may include a first opening 301 into which light is introduced, a through-bore 302 through which the light introduced into the first opening 301 passes, and a second opening 302 from which the light that has passed through the through-bore 302 is discharged to the image sensor 160. For example, each of the first opening 301 and the second opening 302 may have a circular shape, but is not limited thereto, and in another embodiment, may have an elliptical shape or a polygonal shape.

The through-bore 302 in the lens barrel 110 may include lens seating portions P1 to P3, which define hollow regions having different diameters, arranged in a direction from the first opening 301 to the second opening 302.

For example, the diameters of the lens seating portions P1 to P3 may decrease in the direction from the first opening 301 to the second opening 302.

For example, the lens barrel 110 may include a first lens seating portion P1, which is disposed in one end thereof with the first opening 301 and defines the hollow region having a first diameter, a second lens seating portion P2, which is connected at one end thereof to the first lens seating portion P1 and defines the hollow region having a second diameter, and a third lens seating portion P3, which is connected at one end thereof to the other end of the second lens seating portion P2 and is disposed at the other end thereof with the second opening 302.

Referring to FIG. 3b, the plurality of lenses 120-1 to 120-5 may be disposed on the first to third lens seating portions P1 to P3 of the lens barrel 110. The first to third seating portions P1 to P3 may be disposed with lens support portions 111 to 114, which support first to fifth lenses.

The second seating portion P2 of the lens barrel 110 may be configured so as to protrude from the lower surface 322 of the first seating portion P1, and the third seating portion P3 may be configured so as to protrude from the lower surface 324 of the second seating portion P2. The third seating portion P3 of the lens barrel 110 may be a protrusion that is located at the lower end of the lens barrel 110 protruding from the lower surface 324 of the second seating portion P2 of the lens barrel 110.

The lens barrel 110 may be formed of a plastic material, for example, a thermoplastic resin such as polycarbonate, without limitation thereto.

The camera module 100 may further include at least one O-ring 310 between the seating portions P1 to P3 of the lens barrel 110 and the lenses 120-1 to 120-5.

For example, the O-ring 310 may be inserted between the first seating portion P1 and the first lens 120-1. The O-ring 310 may serve to secure the air-tightness of the lens barrel 110 which faces the outside, and may prevent invasion of moisture, for example, by blocking a gap between the two.

The lens array 110 may be designed to realize a predetermined wide angle.

The plurality of lenses 120-1 to 120-5 may be designed in consideration of, for example, the curvature of the lenses and the distance between the lenses, so as to realize a wide angle.

For example, both the entrance surface and the exit surface of the first lens 120-1 may be convex in the upward direction, the second lens 120-2 may have an entrance surface which is convex in the upward direction and an exit surface which is concave in the upward direction, both the entrance surface and the exit surface of the third lens 120-3 may be convex in the upward direction, the fourth lens 120-4 may have an entrance surface which is concave in the upward direction and an exit surface which is convex in the upward direction, and the fifth lens 120-5 may have an entrance surface which is convex in the upward direction and an exit surface which is concave in the upward direction. However, the embodiment is not limited thereto, and a wide angle may be realized by any of various shapes. For example, the upward direction may be the direction from the lower end to the upper end of the lens barrel 110.

In order to realize a wide-angle lens which has a focal length shorter than the focal length of a standard lens (e.g., 40 mm to 60 mm) and which provides an angle of view (e.g., 180 degrees or more) wider than the angle of view of the standard lens, the first lens 120-1, which is disposed the farthest distance from the image sensor 160, may be a lens that has a diameter larger than those of the other lenses (e.g., 120-2 to 120-5) and includes the exit surface which is convex in the upward direction. For this reason, the weight of the lens array 120, which is a wide-angle lens, may be heavier than that of the standard lens, and may protrude from the first seating portion P1 of the lens barrel 120.

The retainer 125 may be coupled to the upper end of the lens barrel 110, may fix the lens array 120 so as to prevent the lens array 120 disposed in the lens barrel 110 from being separated from the lens barrel 110, and may protect the lens array from external impact.

For example, the retainer 125 may be in contact with the first lens 120-1 disposed on the uppermost first seating portion P1, thereby preventing the first lens 120-1 from being separated outwards from the lens barrel 110 and serving to protect the first lens 120-1 from external impact.

The retainer 125 may be formed of a high-strength metal material, but is not limited thereto, and may be formed of a plastic material having high strength.

For example, the retainer 125 may have a shape that corresponds to the shape of the lens barrel 110, for example, a hollow circular shape, without limitation thereto.

For example, the retainer 125 may include an engaging portion 125a, which engages with the outer circumferential surface of the first seating portion P1, which is located at the upper end of the lens barrel 110, and a bent portion 125b, which is bent from the engaging portion 125a so as to support the edge of the lens (e.g., 120-1) of the lens array 120.

For example, a screw thread 321 may be disposed on the outer circumferential surface of the first seating portion P1 of the lens barrel 110, and the engaging portion 125a of the retainer 125 may be disposed on the inner circumferential surface thereof with a screw thread, which engages with the screw thread 321 of the first seating portion P1 of the lens barrel 110.

For example, the upper end of the bent portion 125b may be positioned higher than the upper end of the lens barrel 110, for example, the upper end of the first seating portion P1, and the exit surface of the first lens 120 may bulge outwards from the bent portion 125b.

A ring-shaped groove 212, into which an O-ring 210 is coupled, may be disposed in the outer circumferential surface of the retainer 125.

The embodiment may further include a reinforcement member 129 disposed at a coupling portion between the retainer 125 and the lens barrel 110.

Referring to FIGS. 3b and 3d, the reinforcement member 129 may be disposed on the lower surface 322 of the first seating portion P1 of the lens barrel 110 so as to be in contact with the lower end of the screw thread 321 of the first seating portion P1 of the lens barrel 110 and the lower end of the screw thread of the engaging portion 125a of the retainer 125, which engage with each other.

The reinforcement member 129 may be formed by air-vent-sealing a bonding material, such as epoxy, to the screw-thread engaging portion after the retainer 125 and the lens barrel 110 are screwed to each other.

The reinforcement member 129 may prevent separation or distortion of the retainer 125 and the lens barrel 110, which are coupled to each other.

The bent portion 125b of the retainer 125 may be bent inwards from one end of the engaging portion 125a, and one end of the bent portion 125b may support the edge area of the first lens 120-1.

The first lens 120-1 of the lens array 120 may be exposed from the first seating portion P1 and the retainer 125. The exposed first lens 120-1 may protrude outwards from one end of the first seating portion P1 and the support portion 125b of the retainer 125. Thus, the embodiment may realize a wide angle of 180 degrees or more.

Figure 4A:
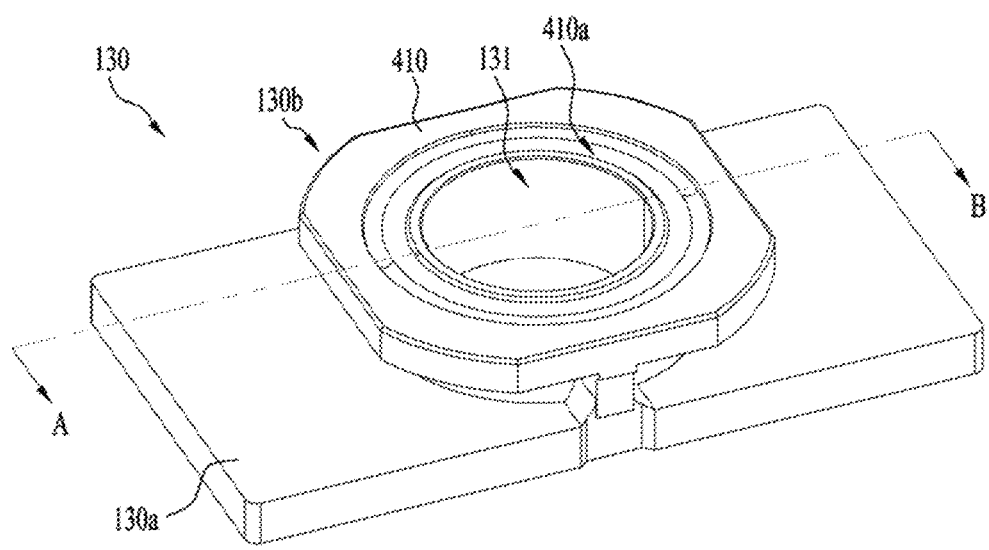
FIG. 4a illustrates a perspective view of a holder illustrated in FIG. 1.
Figure 4B:
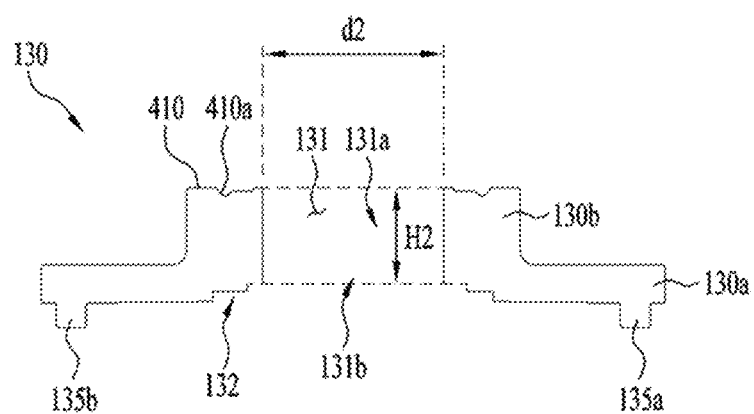
FIG. 4b illustrates a cross-sectional view of the holder illustrated in FIG. 4a taken in the direction AB.

FIG. 4a illustrates a perspective view of the holder 130 illustrated in FIG. 1, and FIG. 4b illustrates a cross-sectional view of the holder 130 illustrated in FIG. 4a taken in the direction AB.

Referring to FIGS. 4a and 4b, the holder 130 supports and fixes the lens barrel 110, and accommodates therein the circuit board 150, the image sensor 160, and the filter 170.

The holder 130 has a hole 131, into which the protrusion (e.g., P3) at the lower end of the lens barrel 110 having a stepped structure is inserted, and an area of the upper surface of the holder 130 around the hole 131 supports an area of the lower surface of the protrusion around the holder 130.

For example, the holder 130 may include a body portion 130a, a support portion 130b positioned on the body portion 130a, and the hole 131 formed in the body portion 130a and the support portion 130b.

The body portion 130a accommodates therein the circuit board 50, the image sensor 160, and the filter 170.

The support portion 130b is disposed on the upper surface of the body portion 130a, and supports the lens barrel 110. The support portion 130b may protrude from the upper surface of the body portion 130a, and may have a cylindrical shape, an elliptical shape, or a polyhedral shape.

The third seating portion P3, which is the protrusion at the lower end of the lens barrel 110 or the lowermost seating portion among the seating portions P1 to P3 of the lens barrel 110, is inserted into the hole 131 in the holder 130.

The hole 131 may include a first opening 131a, into which the third seating portion P3 of the lens barrel 110 is inserted, and a second opening 131b, which is adjacent to the filter 170 and exposes the filter 170. The hole 131 may have the same shape as the shape of the outer circumferential surface of the third seating portion P3 of the lens barrel 110. For example, the hole 131 may have a cylindrical shape, an elliptical shape, or a polygonal shape, without limitation thereto.

The diameter d2 of the hole 131 is greater than the diameter d1 of the outer circumferential surface of the third seating portion P3 of the lens barrel 110 (d2>d1). This serves to prevent the outer circumferential surface of the third seating portion P3 inserted into the hole 131 from coming into contact with the inner surface of the hole 131, in order to realize active alignment of the focal point of the lens array 120, which will be described below.

In addition, the depth H2 of the hole 131 corresponding to the support portion 130b may be greater than the length H1 of the third seating portion P3 of the lens barrel 110 in the vertical direction. This serves to prevent the third seating portion P3 of the lens barrel 110 inserted into the hole 131 from coming into contact with the filter 170. The protrusion of the lens barrel 110 inserted into the hole 131, for example, the lower surface of the third seating portion P3 may be spaced apart from the filter 170.

The body portion 130a and the support portion 130b of the holder 130 may be integrally formed, without limitation thereto.

An accommodating groove 132 may be disposed in the lower surface of the body portion 130a of the holder 130 to accommodate the filter 170 therein. The accommodating groove 132 may be located in contact with the second opening of the hole 131 in the support portion 130b.

Figure 4C:
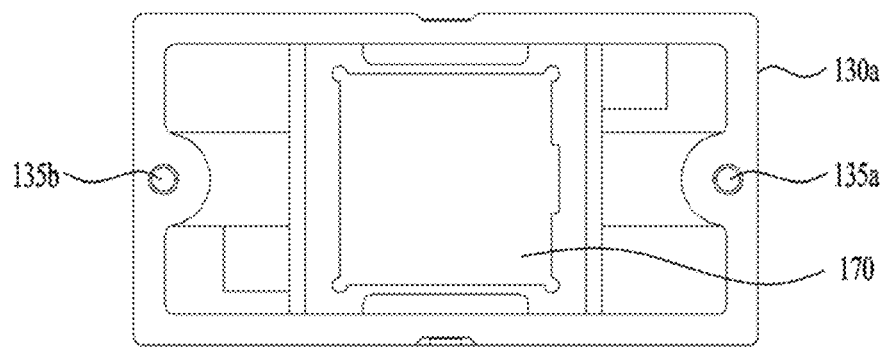
FIG. 4c illustrates a filter disposed in an accommodating groove in the holder illustrated in FIG. 4b.

FIG. 4c illustrates the filter 170 disposed in the accommodating groove 132 of the holder 130 illustrated in FIG. 4b. Referring to FIG. 4c, the filter 170 may be disposed in the accommodating groove 132 and may be fixed in the accommodating groove 132 using an adhesive member or the like.

One or more coupling bosses 135a and 135b may be disposed on the lower surface of the body portion 130a so as to be coupled to the circuit board 150. FIG. 4c illustrates two coupling bosses 135a and 135b, but the number of coupling bosses is not limited thereto and may be at least one.

The first adhesive member 140 couples and fixes the lens barrel 110 and the holder 130 to each other.

The first adhesive member 140 may be disposed between the lower surface 324 around the protrusion 131 of the lens barrel 110 inserted into the hole 131 and the upper surface of the holder, for example, the upper surface of the support portion 130b.

Figure 5:
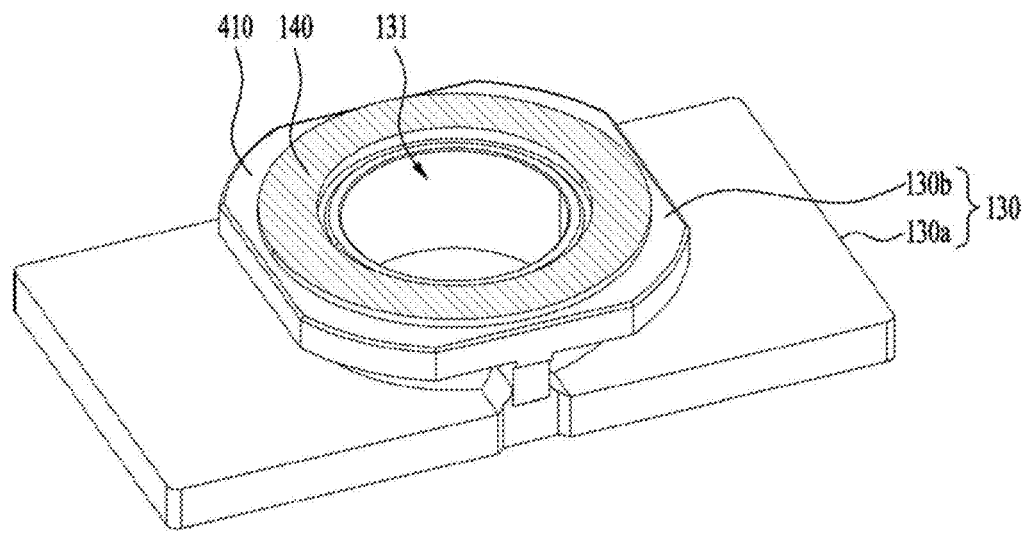
FIG. 5 illustrates a first adhesive member disposed on a holder.

FIG. 5 illustrates the first adhesive member 140 disposed on the holder 130.

Referring to FIGS. 4a, 4b, and 5, the first adhesive member 140 is disposed on an upper surface 410 of the support portion 130b of the holder 130. For example, the first adhesive member 140 may be disposed on the upper surface 410 of the support portion 130b around the hole 131.

For example, the first adhesive member 140 may be disposed in a ring shape on the upper surface 410 of the support portion 130b so as to surround the hole 131.

The upper surface 410 of the support portion 130b of the holder 130 may be disposed with a first groove 410a, which is filled with a portion of the first adhesive member 140. The first groove 410a may be formed in the upper surface of the support portion 130b around the hole 131, and may be formed in a ring shape so as to surround the hole 131.

When the first groove 410a is filled with a portion of the first adhesive member 140, the contact area between the first adhesive member 140, a portion of which fills the first groove 410a, and the holder 130 may increase, whereby adhesive force may be increased.

In addition, the first adhesive member 140 may be a curable adhesive member, for example, a dual curable adhesive member that is completely cured by UV light or heat.

For example, the first adhesive member 140 may be UV-curable and thermosetting epoxy, but is not limited thereto. In another embodiment, the first adhesive member 140 may be either a UV-curable adhesive member or a thermosetting adhesive member.

The first adhesive member 140 may be fluid before being cured.

For example, when an adhesive material is primarily cured by UV light, the material may be pre-cured into a state of having fluidity, and when the adhesive material is secondarily cured by thermal curing after completion of active alignment, which will be described later, the adhesive material is completely cured into a state having no fluidity, so that the first adhesive member 140 may be formed.

The first groove 410a disposed in the upper surface of the support portion 130b of the holder 130 may prevent the first adhesive member 140, which is fluid before being cured, from flowing out of the support portion 130b.

In addition, the first groove 410a in the support portion 130b of the holder 130 may be shaped so as to correspond to the lower surface of the second seating portion P2 of the lens barrel 110. As such, the first adhesive member 140 may be easily cured into a shape that corresponds to the lower surface 324 (see FIG. 3d) of the second seating portion P2, which may enhance the adhesive force between the holder 130 and the lens barrel 110.

In addition, the lower surface 324 of the second seating portion P2 of the lens barrel 110 may also be disposed with a groove 324a (see FIG. 3d), which is filled with a portion of the first adhesive member 140. The groove 324a in the lens barrel 110 may be located so as to correspond to the first groove 410a in the support portion 130b and may have a shape that corresponds to that of the first groove.

An embodiment of a method of manufacturing the camera module including a process of attaching or fixing the lens barrel 110 to the support portion 130b of the holder 130 may be as follows.

First, the lower surface of the holder 130 and the upper surface of the circuit board, on which the image sensor is mounted, are coupled to each other. Subsequently, the first adhesive member 140 is applied to the upper surface of the holder 130, for example, the upper surface of the support portion 130b of the holder.

Subsequently, the first adhesive member 140 is subjected to UV curing.

Subsequently, the lens barrel 110 is seated so that the lower surface of the lens barrel 100 comes into contact with the UV-cured first adhesive member 140.

Subsequently, active alignment is performed in the state in which the lens barrel 110 is seated.

Subsequently, after the active alignment is completed, the first adhesive member 140 is thermally cured in the state in which the lens barrel 110 is seated.

For example, the first adhesive member 140 may correspond to the embodiment of FIG. 5.

Figure 8:
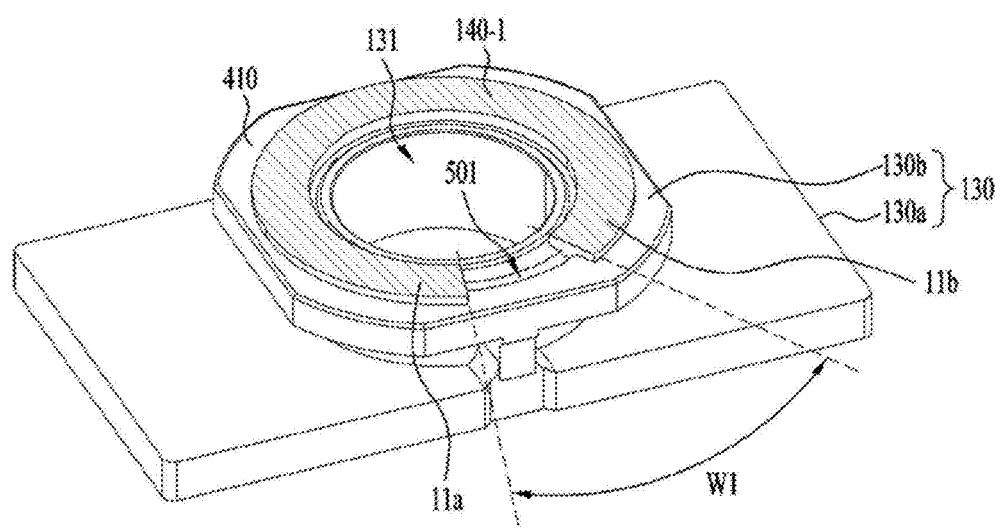
FIG. 8 illustrates a first adhesive member according to another embodiment.
Figure 11:
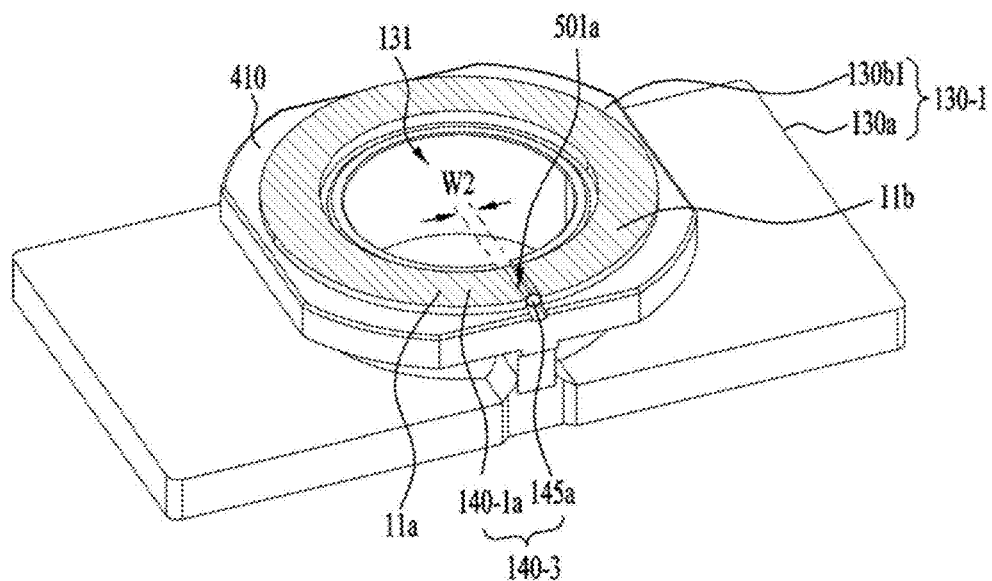
FIG. 11 illustrates first and second adhesive members according to another embodiment.

In addition, the first adhesive member may correspond to the embodiment 140-1 illustrated in FIG. 8, or may correspond to the embodiment 140-1a illustrated in FIG. 11.

In the case in which the first adhesive member corresponds to the embodiment of FIG. 8 or FIG. 11, in the first adhesive member application step, one end and the other end of the first adhesive member 140-1 or 140-1a may be spaced apart from each other, and an opening may be disposed between one end and the other end of the first adhesive member 140-1 or 140-1a so that a gas generated during the UV curing or thermal curing of the first adhesive members 140-1 or 140-1a is discharged through the opening.

Subsequently, after the curing of the first adhesive member 140-1 or 140-1a is completed, a second adhesive member 145 or 145a is applied to or formed in an opening 501 located between the upper surface of the holder 130, for example, the upper surface 410 of the support portion 130b and the lower surface of the lens barrel 110, for example, the lower surface 324 of the second seating portion P2.

Subsequently, the second adhesive member 145 or 145a is subjected to UV curing.

The following description of the first adhesive member 140-1 or 140-1a and the second adhesive member 145 or 145a may be applied to all embodiments of the method of manufacturing the camera module described above.

Figure 6:
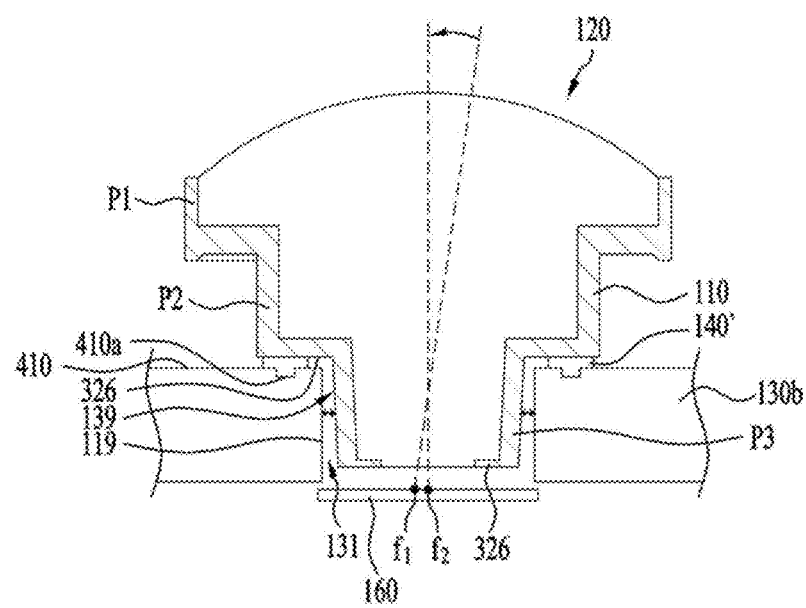
FIGS. 6 and 7 illustrate a process of attaching or fixing the lens barrel to a support portion of the holder.
Figure 7:
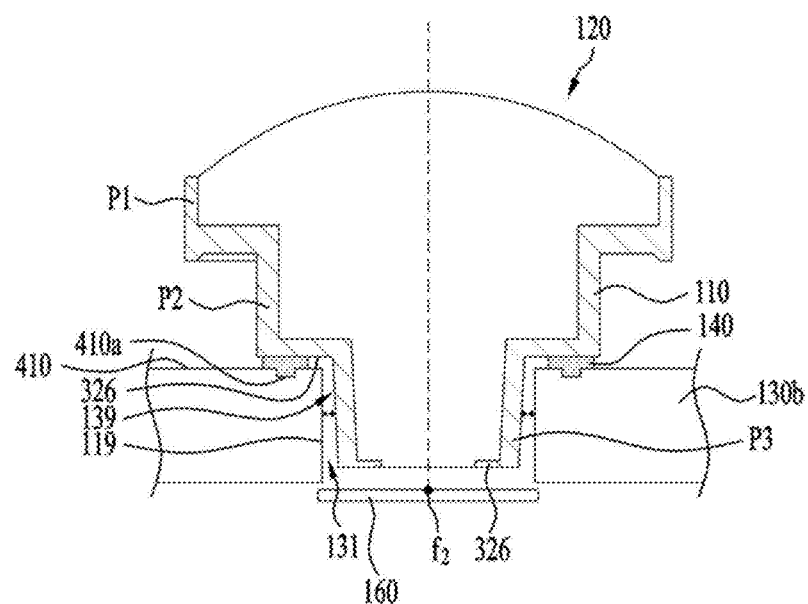

FIGS. 6 and 7 illustrate a process of attaching or fixing the lens barrel 110 to the support portion 130b of the holder 130.

Referring to FIG. 6, an adhesive material 140', for example, thermosetting epoxy or UV-curable epoxy is applied to the upper surface 410 of the support portion 130b of the holder 130. For example, the adhesive material 140' may be applied to the upper surface 410 of the support portion 130b of the holder 130 so that the first groove 410a is filled with the adhesive material 140'.

The circuit board 150, on which the filter 170 and the image sensor 160 are mounted, may be coupled to the holder 130 before the adhesive material 140' is applied to the upper surface 410 of the support portion 130b of the holder 130.

Subsequently, the third seating portion P3 of the lens barrel 110 is inserted into the hole 131 in the support portion 130b of the holder 130, and the lens barrel 110 is seated on the upper surface of the support portion 130b of the holder 130 so that the lower surface 324 of the second seating portion P2 of the lens barrel 110 comes into contact with the adhesive material 140'.

Since the adhesive material 140' is fluid before being cured, the lens barrel 110, which is seated on the adhesive material before being cured, may tilt in the state in which the third seating portion P3 of the lens barrel 110 is inserted into the hole 131.

For example, in the state in which the lens barrel 110 is in contact with the adhesive material 140', the lens barrel 110 may be moved in order to adjust the focal point of the lens array 120 mounted in the lens barrel 110 relative to the image sensor 160.

For example, the lens barrel 110 may be moved forwards and rearwards and rightwards and leftwards so as to adjust the focal point of the lens array 120 mounted in the lens barrel 110 from a first focal point f1 to a second focal point f2, which is a desired target focal point. This adjustment of the focal point of the lens array 120 by directly moving the lens barrel 110 is referred to as "active alignment".

In order to perform active alignment, the protrusion of the lens barrel 110 inserted into the hole 131, for example, the outer circumferential surface 139 of the third seating portion P3 is spaced apart from the inner circumferential surface 119 of the hole 131.

This is because active alignment may not be performed by moving the lens barrel 110 when the outer circumferential surface 139 of the third seating portion P3 of the lens barrel 110 inserted into the hole 131 is brought into contact with the inner circumferential surface 119 of the hole 131 or when the outer circumferential surface 139 of the third seating portion P3 is fastened to the inner circumferential surface 119 of the hole 131 via screw-threads or the like.

Subsequently, as illustrated in FIG. 7, the focal point of the lens array 120 may be adjusted to the target focal point through active alignment, and then, the adhesive material may be cured by thermal curing or UV curing so that the first adhesive member 140 is formed.

FIG. 8 illustrates the first adhesive member 140-1 according to another embodiment.

The first adhesive member 140 illustrated in FIG. 5 has a ring shape, but the adhesive member 140-1 illustrated in FIG. 8 may have the opening 501 formed by removing a portion of the ring-shaped first adhesive member 140.

The first adhesive member 140 includes one end 11a and the other end 11b arranged so as to surround the hole 131. The one end 11a and the other end 11b of the first adhesive member 140 are spaced apart from each other. For example, the first adhesive member 140 may take the form of a ring having the opening 501, which is located between the one end 11a and the other end 11b spaced apart from each other and is formed in the transverse direction. Here, the transverse direction may be the direction from the inner circumferential surface to the outer circumferential surface of the first adhesive member 140 and/or the direction opposite thereto.

For example, one end of the opening 501 may be open to the inner circumferential surface of the first adhesive member 140, and the other end of the opening 501 may be open to the outer circumferential surface of the first adhesive member 140.

For example, in order to ensure easy and efficient gas discharge, the distance between the one end 11a and the other end 11b of the first adhesive member 140 may gradually increase in the direction from the inner circumferential surface to the outer circumferential surface of the first adhesive member 140, but is not limited thereto. In another embodiment, the distance between the one end 11a and the other end 11b of the first adhesive member 140 may be constant in the direction from the inner circumferential surface to the outer circumferential surface of the first adhesive member 140. For example, the distance between the one end 11a and the other end 11b of the first adhesive member 140 may be indicated by "W1", which is the width of the opening 501 in FIG. 8.

The length of the entire first adhesive member 140 may be greater than the distance between the one end 11a and the other end 11b of the first adhesive member 140. For example, the distance between the one end 11a and the other end 11b of the first adhesive member 140 may be equal to or less than ¼ of the length of the entire first adhesive member 140. The reason for this is that, when the distance between the one end 11a and the other end 11b of the first adhesive member 140 exceeds ¼ of the length of the entire first adhesive member 140, adhesion performance of the first adhesive member 140 may deteriorate, thus causing separation of the lens barrel 110 and the holder 130.

When the adhesive material 140' is subjected to thermal curing or UV curing, a gas may be generated from the adhesive material 140'.

In the case of FIG. 5, since the lens barrel 110 and the holder 130 are bonded to each other by the first adhesive member 140 after the protrusion of the lens barrel 110 is inserted into the hole 131 in the holder 130 in the state in which the circuit board 150 and the holder 130 are coupled, the space defined by the protrusion of the lens barrel 110, the holder 130, and the circuit board 150 may be hermetically sealed.

That is, in the case of FIG. 5, due to a sealed structure in which the gas generated during the thermal curing or UV curing of the first adhesive member 140 cannot escape to the outside, the adhesive material 140' may swell and consequently push the lens barrel 110 upwards. Thereby, the focal point of the lens array 120 mounted in the lens barrel 110 may change, which may deteriorate the resolution of the camera module 100.

The first adhesive member 140-1 of FIG. 8 has the opening 501, through which the gas generated during the thermal curing or UV curing of the adhesive material 140' may escape to the outside.

Since the gas generated during the thermal curing or UV curing is discharged to the outside through the opening in the first adhesive member 140-1, the embodiment may prevent the focal point of the lens array 120 from deviating due to the gas generated during the curing of the adhesive material, and consequently, may prevent deterioration in resolution.

Figure 9:
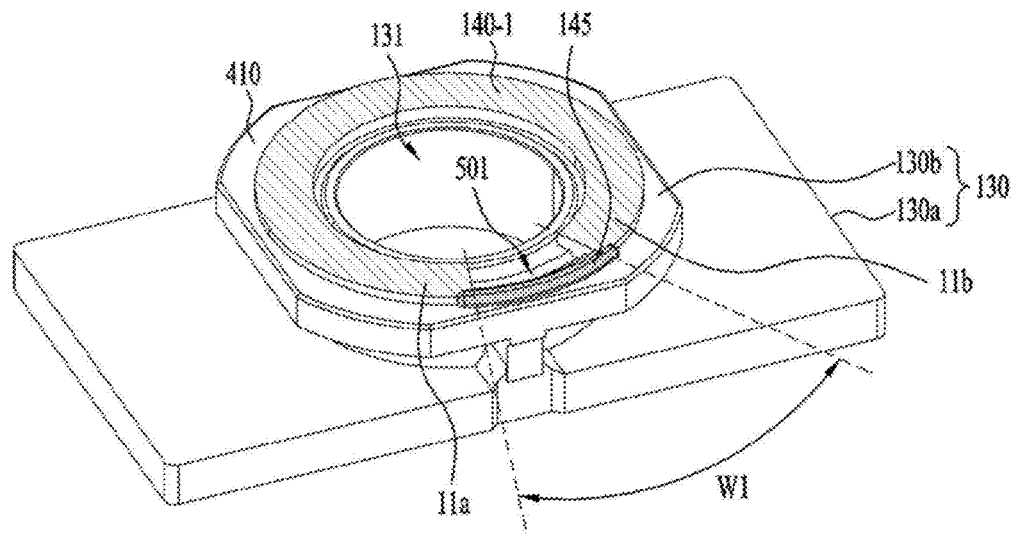
FIG. 9 illustrates first and second adhesive members according to another embodiment.

FIG. 9 illustrates the first and second adhesive members 140-1 and 145 according to another embodiment. The same reference numerals as those in FIG. 8 denote the same components, and a description of the same components will be simplified or omitted.

Referring to FIG. 9, the embodiment may further include the second adhesive member 145 in addition to the first adhesive member 140-1 illustrated in FIG. 8.

The second adhesive member 145 may be disposed in the opening 501, which is located between the upper surface 410 of the support portion 130b of the holder 130 and the lower surface 324 of the second seating portion P2 of the lens barrel 110. The openings 501 may be located between the one end 11a and the other end 11b of the first adhesive member 140-1, which are spaced apart from each other.

The second adhesive member 145 may be in contact with the outer surface of the one end 11a of the first adhesive member 140-1 and the outer surface of the other end 11b, which are adjacent to the opening 501, and may be spaced apart from the inner surface of the one end 11a and the inner surface of the other end 11b of the first adhesive member 140-1.

For example, the second adhesive member 145 may be disposed on the upper surface of the support portion 130b of the holder 130, which is adjacent to the outer surfaces of the one end 11a and the other end 11b of the first adhesive member 140-1, and may be disposed in a gap, which is generated between the upper surface 410 of the support portion 130b of the holder 130 and the lower surface 324 of the second seating portion P2 of the lens barrel 110 due to the opening 501 in the first adhesive member 140-1.

For example, the second adhesive member 145 may be disposed in the opening 501 in the first adhesive member 140-1 between the upper surface 410 of the support portion 130b of the holder 130 and the lower surface 324 of the second seating portion P2 of the lens barrel 110.

After the curing of the first adhesive member 140-1 of FIG. 8 is completed, the second adhesive member 145 may be formed by air-vent sealing an adhesive material through the opening 501 in the first adhesive member 140-1 so as to cover the gap between the upper surface 410 of the support portion 130b of the holder 130 and the lower surface 324 of the second sealing portion P2 of the lens barrel 110. Thus, as illustrated in FIG. 9, the second adhesive member 145 may be formed so as to connect only the outer surfaces of the one end 11a and the other end 11b of the first adhesive member 140-1 to each other, and may not cover the inner surfaces of the one end 11a and the other end 11b of the first adhesive member 140-1.

For example, the second adhesive member 145 may be formed of a UV-curable adhesive member, for example, UV epoxy.

The second adhesive member 145 serves only to prevent the opening 501 between the upper surface 410 of the support portion 130b of the holder 130 and the lower surface 324 of the second seating portion P2 of the lens barrel 110 from being open to the outside. Therefore, the width of the second adhesive member 145 in the first direction may be less than the width of the first adhesive member 140-1 in the first direction.

For example, the width in the first direction may be a length in a direction perpendicular to the longitudinal direction. For example, the width of the first adhesive member 140-1 may be a length in the direction from the inner surface to the outer surface of the first adhesive member 140-1, and the width of the second adhesive member 145 may be a length in the direction from a first surface to a second surface of the second adhesive member 145, which face each other. Here, the first surface may be a surface that faces the hole 131.

Since the gap, which is formed between the upper surface 410 of the support portion 130b of the holder 130 and the lower surface 324 of the second seating portion P2 of the lens barrel 110 due to the opening 501, is sealed by the second adhesive member 145, the embodiment may prevent, for example, moisture or foreign substances from being introduced into the lens barrel 110 through the opening.

Figure 10:
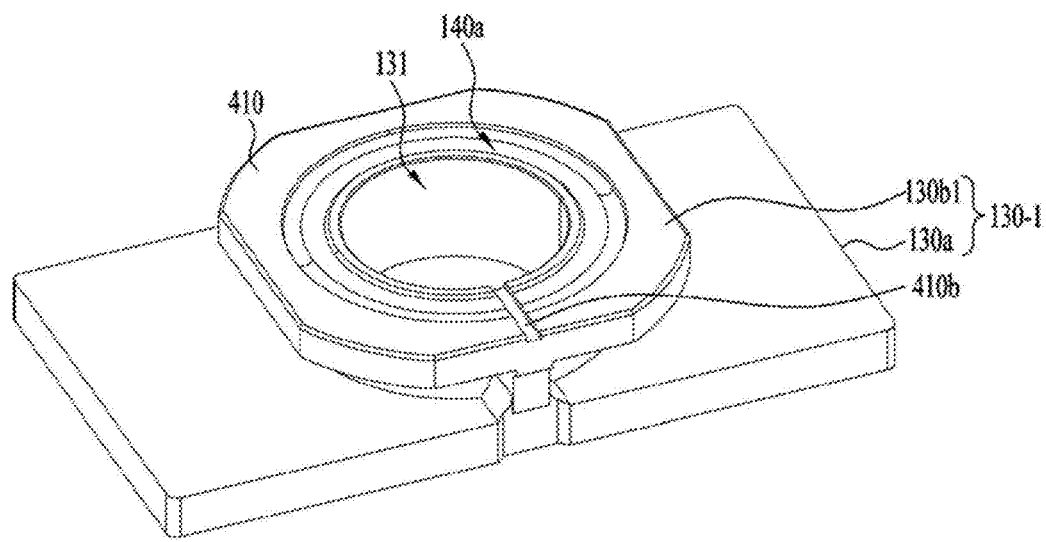
FIG. 10 illustrates a holder according to another embodiment.

FIG. 10 illustrates a holder 130-1 according to another embodiment, and FIG. 11 illustrates first and second adhesive members according to another embodiment.

Referring to FIG. 10, in addition to the first groove 410a, a second groove 410b may be formed in the upper surface of the support portion 130b1 of the holder 130-1.

The first groove 410a may be located between the first opening 131a of the hole 131 in the support portion 130b and the edge of the upper surface 410 of the support portion 130b and may take the form of a ring so as to surround the hole 131. On the other hand, the second groove 410b may be formed so as to extend from the edge of the upper surface 410 of the support portion 130b to the hole 131, one end of the second groove 410b may be exposed or open to the hole 131, and the other end of the second groove 410b may be exposed or open to the outside of the side surface of the support portion 130b.

A portion of the second groove 410b may overlap the first groove 410a, and the depth of the second groove 410b may be greater than the depth of the first groove 410a. The depth of each of the first and second grooves 410a and 410b may be the depth from the upper surface 410 of the support portion 130b to the bottom of the first and second grooves 410a and 410b.

Referring to FIG. 11, the first adhesive member 140-1a may be disposed on the upper surface 410 of the support portion 130b1 so as to fill the first groove 410a, but not the second groove 410b. For example, the first adhesive member 140-1a may have a ring shape having an opening 501a in the transverse direction, and the opening 501a in the first adhesive member 140-1a may be located so as to correspond to or be aligned with the second groove 410a. Here, the transverse direction may be the direction from the inner circumferential surface to the outer circumferential surface of the first adhesive member 140-1a and/or the direction opposite thereto.

For example, one end and the other end of the first adhesive member 140-1a may be in contact with the second groove 410a.

The second adhesive member 145a illustrated in FIG. 11 may be formed through air-vent sealing after the curing of the first adhesive member 140-1a is completed.

The second adhesive member 145a may be disposed in the gap, which is formed between the upper surface 410 of the support portion 130b of the holder 130 and the lower surface 324 of the second seating portion P2 of the lens barrel 110 due to the opening 501a and the second groove 410a.

For example, the second adhesive member 145a may be disposed in the opening 501a and the second groove 410a between the upper surface 410 of the support portion 130b of the holder 130 and the lower surface 324 of the second seating portion P2 of the lens barrel 110.

For example, the second adhesive member 145a may be disposed at the other end of the second groove 410b, which is open to the outside of the side surface of the support portion 130b, and may be spaced apart from one end of the second groove 410b, which is open to the hole 131.

In addition, the second adhesive member 145a may be in contact with the outer circumferential surface of the one end 11a of the first adhesive member 140-1a and the outer circumferential surface of the other end 11b, and may be spaced apart from the inner circumferential surface of the one end 11a and the inner circumferential surface of the other end 11b of the first adhesive member 140-1a.

For example, the second adhesive member 145a may be disposed closer to the other end than the one end of the second groove 410b.

Compared with the embodiments illustrated in FIGS. 8 and 9, the embodiment illustrated in FIG. 11 may allow the gas generated during the curing of the first adhesive member 140-1a to be easily discharged through the second groove 410b in the holder 130-1. Thereby, even if the width W2 of the opening 501a in the first adhesive member 140-1a is less than the width W1 of the opening 501 in the first adhesive member 140-1, the gas generated during the curing of the first adhesive member 140-1a may be easily discharged.

In addition, since the width W2 of the opening 501a in the first adhesive member 140-1a is less than the width W1 of the opening 501 in the first adhesive member 140-1, the adhesive force of the first adhesive member 140-1a may be enhanced.

In addition, since the width W2 of the opening 501a in the first adhesive member 140-1a is less than the width W1 of the opening 501 in the first adhesive member 140-1, the second adhesive member 145a, which serves to prevent the introduction of moisture and foreign substances, may be easily formed and air-tightness may be improved.

In FIGS. 4a, 8, and 10, the first groove 410a is formed in the upper surface 410 of the support portion 130b of the holder 130 or 130-1, but is not limited thereto. In another embodiment, the first grooves 410a may be omitted, and the first adhesive member 140, 140-1 or 140-1a may be disposed on the upper surface 410 of the support portion 130b of the holder 130 or 130-1 in which the first groove 410a is omitted.

Figure 12:
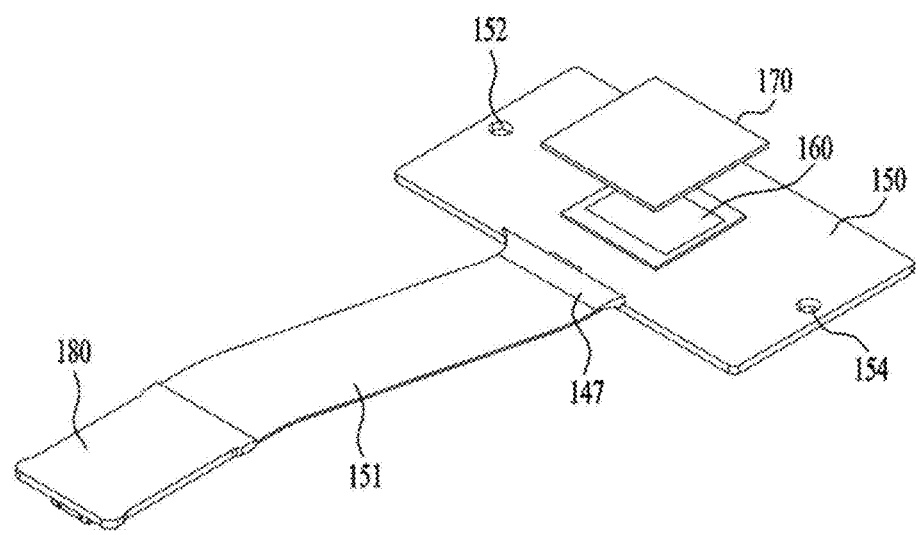
FIG. 12 illustrates a first perspective view of a circuit board, an image sensor, a filter, a third adhesive member, and a connector illustrated in FIG. 1.
Figure 13:
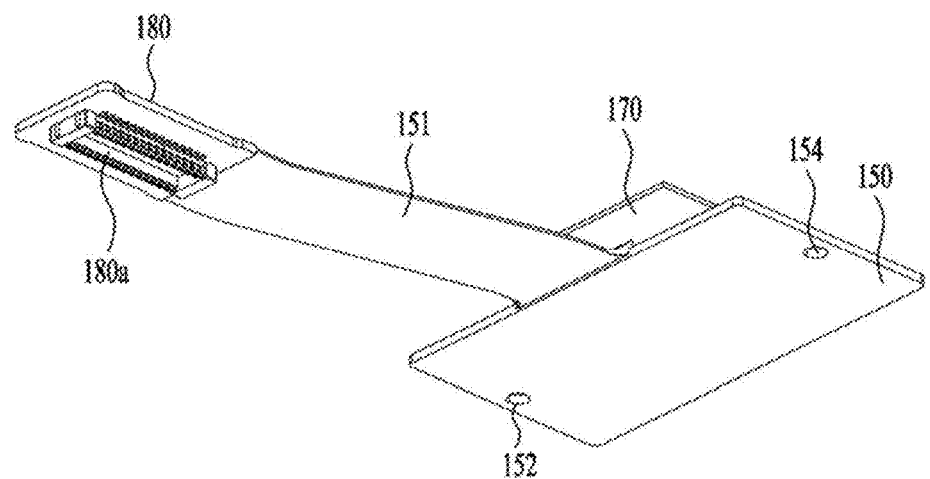
FIG. 13 illustrates a second perspective view of the circuit board, the image sensor, the filter, the third adhesive member, and the connector illustrated in FIG. 1.

FIG. 12 illustrates a first perspective view of the circuit board 150, the image sensor 160, the filter 170, a third adhesive member 147, and the connector 180 illustrated in FIG. 1, and FIG. 13 is a second perspective view of the circuit board 150, the image sensor 160, the filter 170, the third adhesive member 147, and the connector 180 illustrated in FIG. 1.

Referring to FIGS. 12 and 13, the filter 170 may be located between the lens array 120 of the lens barrel 110 and the image sensor, and may be disposed in the accommodating groove 132 in the holder 130.

The filter 170 blocks light in a specific frequency band of the light which has passed through the lens barrel 110 from being incident on the image sensor 810. For example, the filter 170 may be an infrared-ray blocking filter, without limitation thereto.

The image sensor 160 is mounted or placed on the circuit board 150 so as to be located under the holder 130, and serves to detect an image included in the light which has passed through the filter 170, to convert the detected image into an electric signal, and to output the electric signal. The lens array 120, the filter 170, and the image sensor 160 may be aligned with each other in a direction parallel to the optical axis.

The circuit board 150 is coupled to the body portion 130a of the holder 130.

For example, the circuit board 150 may be disposed with one or more holes 152 and 154, into which the one or more coupling bosses 135a and 135b disposed on the lower surface of the body portion 130a of the holder 130 are coupled.

A fourth adhesive member 632 (see FIG. 17) may be disposed between the lower surface of the body portion 130a of the circuit board 150 and the upper surface of the circuit board 150 for coupling the circuit board 150 and the body portion 130a of the holder 130 to each other. The fourth adhesive member 632 will be described below with reference to FIG. 17.

Various elements or circuit patterns may be disposed on the circuit board 150 in order to convert an image formed on the image sensor 160 into an electric signal and transmit the electric signal to an external device.

The connector 180 may be electrically connected to the circuit board 150, and may include a port 180a to be electrically connected to an external device. In the embodiment, the circuit board 150 may include a flexible substrate 151, which connects the image sensor 160 and the connector 180 to each other.

The embodiment may further include the third adhesive member 147 for bonding one end of the flexible substrate 151 of the circuit board 150 to the side surface of the body portion 130a of the holder 130. The third adhesive member 147 serves to fix the flexible substrate 151 connected to the connector 180 to the holder 130.

Figure 14:
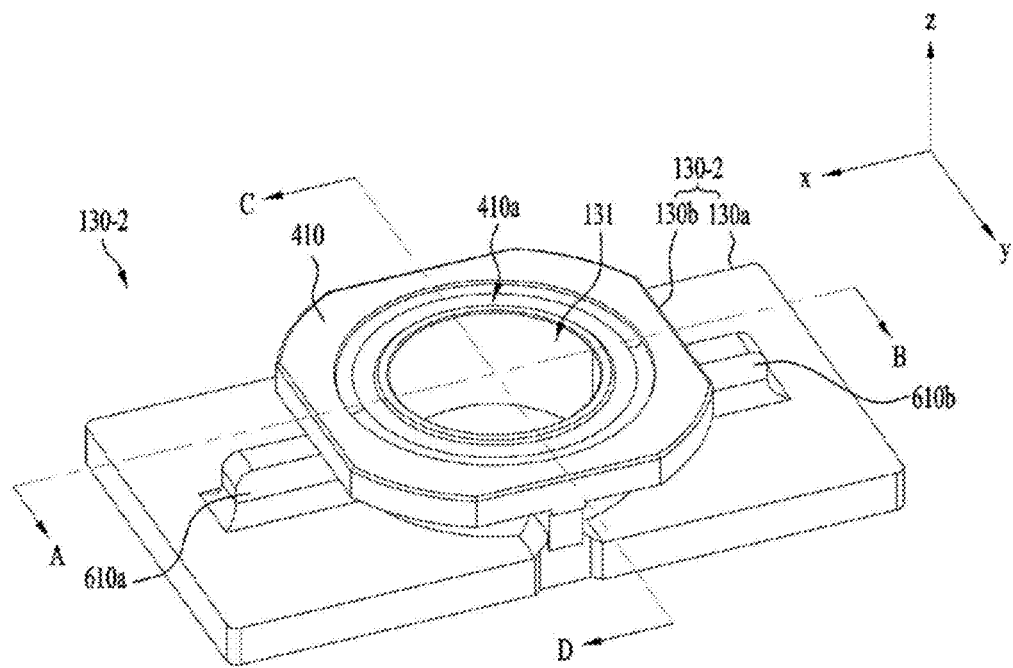
FIG. 14 illustrates a perspective view of a holder according to another embodiment.
Figure 15A:
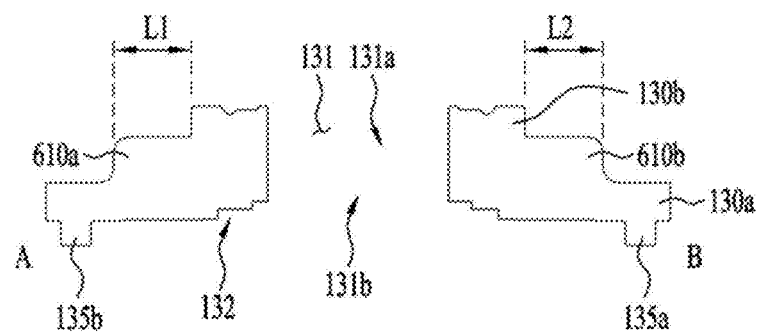
FIG. 15a illustrates a cross-sectional view of the holder illustrated in FIG. 14 taken in the direction AB.
Figure 15B:
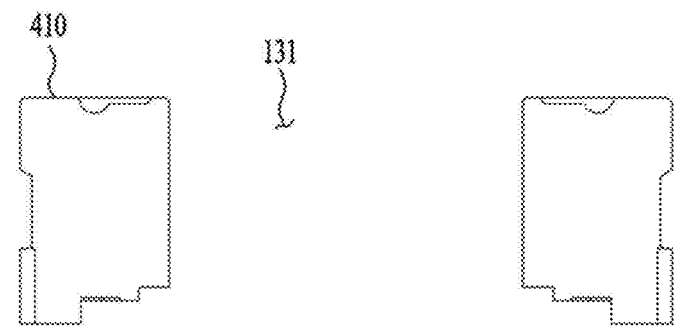
FIG. 15b illustrates a cross-sectional view of the holder illustrated in FIG. 14 taken in the direction CD.

FIG. 14 illustrates a perspective view of a holder 130-2 according to another embodiment, FIG. 15a illustrates a cross-sectional view of the holder 130-2 illustrated in FIG. taken in the direction AB, and FIG. 15B illustrates a cross-sectional view of the holder 130-2 illustrated in FIG. 14 taken in the direction CD.

Referring to FIGS. 14 to 15b, the holder 130-2 may further include reinforcement support portions 610a and 610b, in contrast with the embodiment illustrated in FIG. 4a.

The reinforcement support portions 610a and 610b are spaced apart from each other on the upper surface of the body 130a of the holder 130-2. The reinforcement support portions 610a and 610b may protrude from the upper surface of the body 130a of the holder 130-2, and one end of each of the reinforcement support portions 610a and 610b is in contact with the side surface of the support portion 130b of the holder 130-2.

The vertical distance to the upper surface of the reinforcement support portions 610a and 610b from the upper surface of the body portion 130a may be less than the vertical distance to the upper surface of the support portion 130b. As illustrated in FIG. 15, the cross section of the reinforcement support portion and the support portion 130b from the upper surface of the body portion 130a may have a stepped structure in the direction AB.

In FIGS. 14 to 15b, the reinforcement support portions 610a and 610b may be disposed so as to face each other in a direction parallel to the long side of the upper surface of the body portion 130a, and may protrude in the horizontal direction from the side surface of the support portion 130b of the holder 130-2.

In another embodiment, the reinforcement support portions may be radially arranged around the support portion 130b so as to be connected to the support portion 130b.

For example, the reinforcement support portions 610a and 610b of FIG. 14 may be parallel to the long side of the upper surface of the body portion 130a, but are not limited thereto. In another embodiment, the reinforcement support portions may be parallel to the short side of the upper surface of the body portion 130a.

In addition, another embodiment may include reinforcement support portions, which are parallel to the long side of the upper surface of the body portion 130a, and reinforcement support portions, which are parallel to the short side of the upper surface of the body portion 130a. In this case, the length of the reinforcement support portions parallel to the long side of the upper surface of the body portion 130a may be greater than the length of the reinforcement support portions parallel to the short side of the upper surface of the body portion 130a.

The reinforcement support portions 610a and 610b may serve to prevent the holder 130-2 from being damaged or warped due to impact or stress received by the holder 130-2 in a direction perpendicular to the optical axis OA, for example, in the X-axis or Y-axis direction.

Since the lens array for realizing a wide angle is generally heavier than a lens for realizing a narrow angle, the holder may be broken or warp by external impact or stress applied to the lens array.

In addition, in the structure in which the lens barrel 110 and the holder 130 are fixed by the adhesive members 140 formed of, for example, epoxy in order to realize the active alignment as in the embodiment, since the strength of the holder may be poor due to external impact or stress, the embodiment illustrated in FIG. 14 prevents the holder 130 from being damaged or warped by external impact or stress through the use of the reinforcement support portions 610a and 610b.

Figure 16:
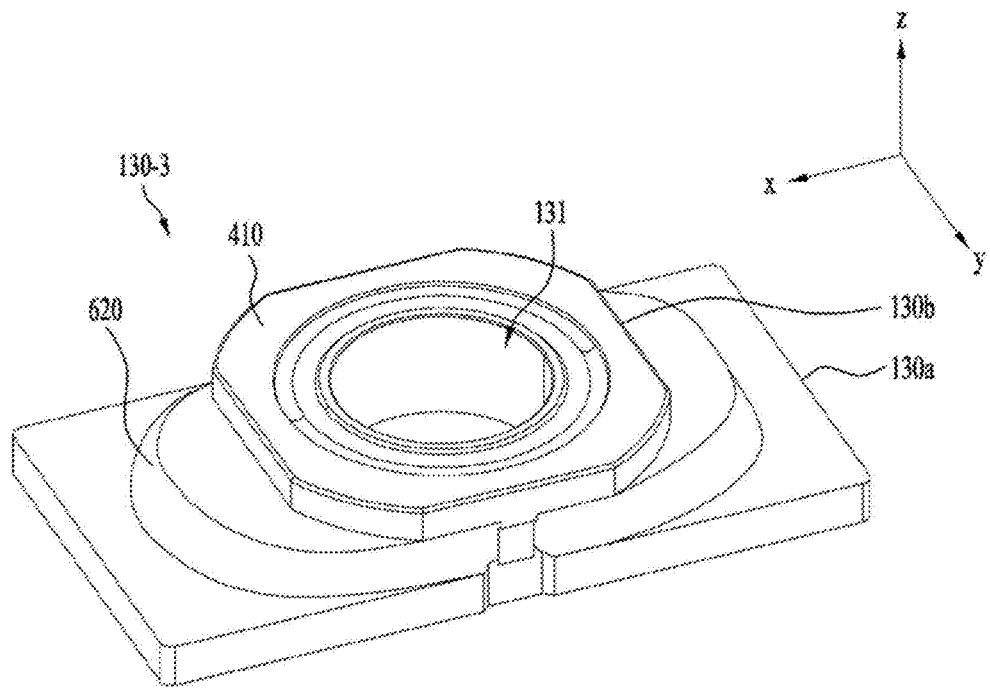
FIG. 16 illustrates a perspective view of a holder including a reinforcement support portion according to another embodiment.

FIG. 16 illustrates a perspective view of a holder 130-3 including a reinforcement support portion 620 according to another embodiment.

In the embodiment of FIG. 14, the multiple reinforcement support portions 610a and 610b are spaced apart from each other and are disposed on the upper surface of the body portion 130a. In contrast, the reinforcement support portion 620 in the embodiment of FIG. 16 may take the form of a single ring that surrounds the side surface of the support portion 130b.

The vertical distance to the upper surface of the reinforcement support portion 620 from the upper surface of the body portion 130a may be less than the vertical distance to the upper surface of the support portion.

The reinforcement support portions 610a and 610b of FIG. 14 may be suitable for resistance against impact in the X-axis direction, whereas the reinforcement support portion 620 illustrated in FIG. 16 may function to resist impact and prevent warping in any direction within 360 degrees in the XY plane.

Figure 17:
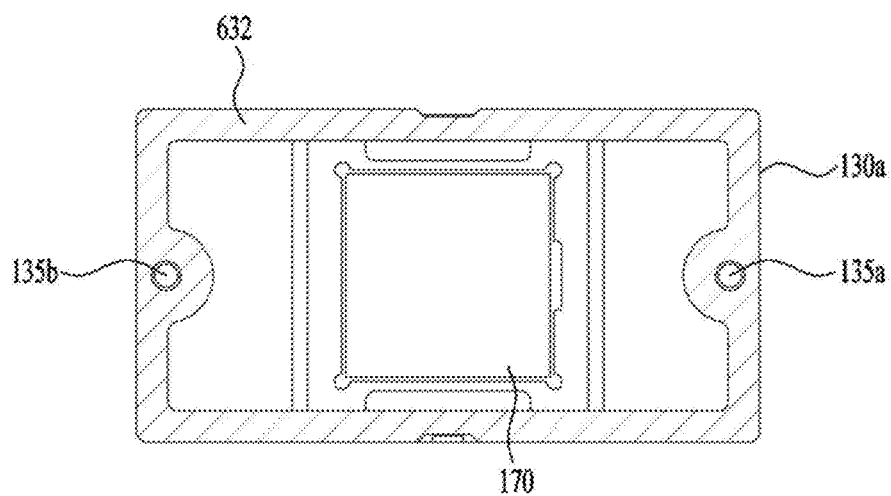
FIG. 17 illustrates a fourth adhesive member disposed on the lower surface of a body portion of the holder.

FIG. 17 illustrates a fourth adhesive member 632 disposed on the lower surface of the body portion 130*a* of any one of the holders 130 and 130-1 to 130-3.

Referring to FIG. 17, the fourth adhesive member 632 may be disposed on the edge of the lower surface of the body portion 130*a* of the holders 130 and 130-1 to 130-3 so as to be spaced apart from the filter 170, which is disposed in the central area of the lower surface of the body portion 130*a* of the holders 130 and 130-1 to 130-3, and serves to bond the circuit board 150 to the body portion 130*a* of the holder 130.

In addition, in order to fix or attach the coupling bosses 135*a* and 135*b* of the holders 130 and 130-1 to 130-3 to the holes 152 and 154 in the circuit board 150, the fourth adhesive member 632 may be disposed on the coupling bosses and the lower surface of the body portion 130*a* around the coupling bosses 135*a* and 135*b*.

The fourth adhesive member 632 may be an air-vent sealing adhesive member, for example, epoxy, without limitation thereto.

The embodiment may further include a reinforcement adhesive member for enhancing the adhesive force between the holders 130 and 130-1 to 130-3 and the circuit board 150 and for preventing warping of the holder or strengthening the holder, in addition to the fourth adhesive member 632.

Figure 18A:
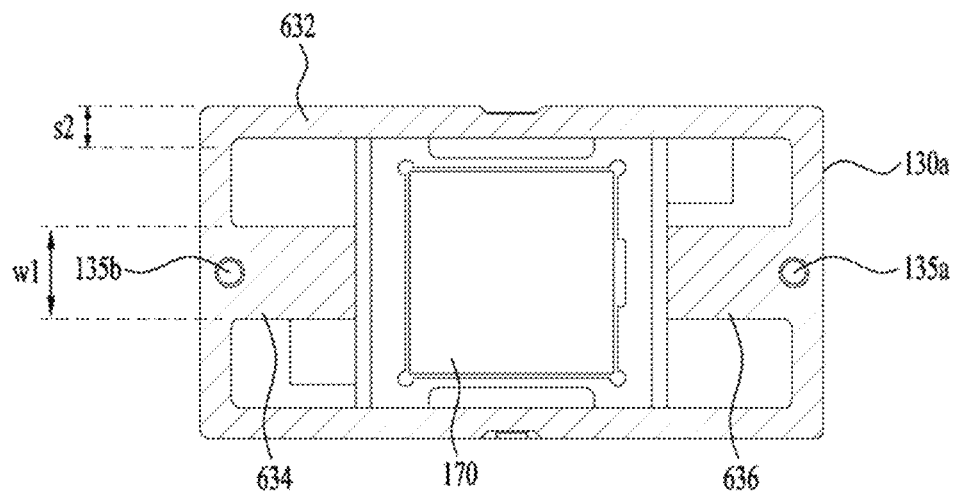
FIG. 18a illustrates an embodiment of a first reinforcement adhesive member disposed on the lower surface of the holder.

FIG. 18*a* illustrates an embodiment of first reinforcement adhesive members 634 and 636 disposed on the lower surface of the holders 130 and 130-1 to 130-3.

Referring to FIG. 18*a*, the first reinforcement adhesive members 634 and 636 may be disposed on the lower surface of the body portion 130*a* so that one end thereof is connected to a first area of the fourth adhesive member 632 and the other end thereof extends in a direction parallel to the long side of the lower surface of the body portion 130*a* of the holders 130 and 130-1 to 130-3.

For example, the first reinforcement adhesive members 634 and 636 may be connected at one end thereof to the coupling bosses 135*a* and 135*b*, and the other end thereof may extend in a direction parallel to the long side of the lower surface of the body portion 130*a* of the holders 130 and 130-1 to 130-3.

The width W1 of the first reinforcement adhesive members 634 and 636 may be greater than or equal to the width W2 of the fourth adhesive member 632 (W1≥W2). Each of the widths W1 and W2 may be a length in a direction perpendicular to the long side of the lower surface of the body portion 130*a*.

FIG. 18*a* illustrates two first reinforcement adhesive members 634 and 636, which face each other, without limitation thereto. In another embodiment, the number of first reinforcement adhesive members may be one or more.

The first reinforcement adhesive members 634 and 636 may be an air-vent sealing adhesive member, for example, epoxy, without limitation thereto.

Figure 18B:
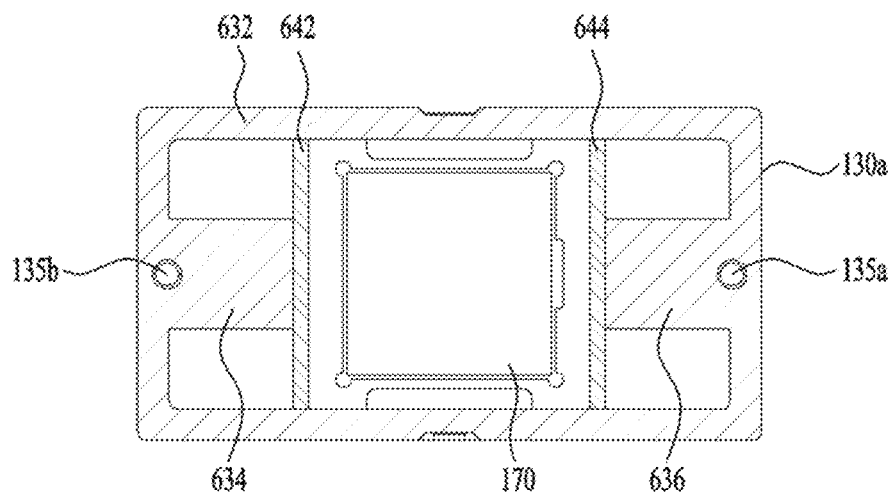
FIG. 18b illustrates an embodiment of the first reinforcement adhesive member and a second reinforcement adhesive member disposed on the lower surface of the holder.

FIG. 18*b* illustrates an embodiment of the first reinforcement adhesive members 634 and 636 and second reinforcement adhesive members 642 and 644 disposed on the lower surface of the holders 130 and 130-1 to 130-3.

The embodiment may further include the second reinforcement adhesive member 644 and 646 in addition to the first reinforcement adhesive members 634 and 636 illustrated in FIG. 18*a*.

In order to enhance the strength and prevent warping, the second reinforcement adhesive members 642 and 644 may be connected at one end thereof to a second area of the fourth adhesive member 632, and the other end thereof may extend in a direction parallel to the short side of the lower surface of the body portion 130*a* of the holders 130 and 130-1 to 130-3 so as to be connected to a third area of the fourth adhesive member 632. The first to third areas of the fourth adhesive member 632 may be different areas spaced apart from each other.

In addition, the first and second reinforcement adhesive members 634, 636, 642 and 644 may be spaced apart from the filter 170 disposed on the lower surface of the holders 130 and 130-1 to 130-3. In addition, in order to increase strength and prevent warping, an area between one end and the other end of each of the second reinforcement adhesive members 642 and 644 may be connected to the other end of a corresponding one of the first reinforcement adhesive members 634 and 636.

The width of the second reinforcement adhesive members 642 and 644 may be less than or equal to the width of the fourth adhesive member 632. The width of the second reinforcement adhesive members 642 and 644 may be a length in a direction parallel to the long side of the lower surface of the body portion 130*a*.

FIG. 18*b* illustrates two second reinforcement adhesive members 642 and 644, which face each other, without limitation thereto. In another embodiment, the number of second reinforcement adhesive members may be one or more.

The second reinforcement adhesive members 644 and 646 may be an air-vent sealing adhesive member, for example, epoxy, without limitation thereto.

Another embodiment may include only the fourth adhesive member 632 and the second reinforcement adhesive members 644 and 646 except for the first reinforcement adhesive members 634 and 636.

Through the provision of the first and second reinforcement adhesive members 634 and 636 and 642 and 644, it is possible to improve the strength of the holders 130 and 130-1 to 130-3 for overcoming external impact and to prevent warping of the holders 130 and 130-1 to 130-3 due to external impact. Thereby, the embodiment may achieve enhanced reliability.

Figure 19:
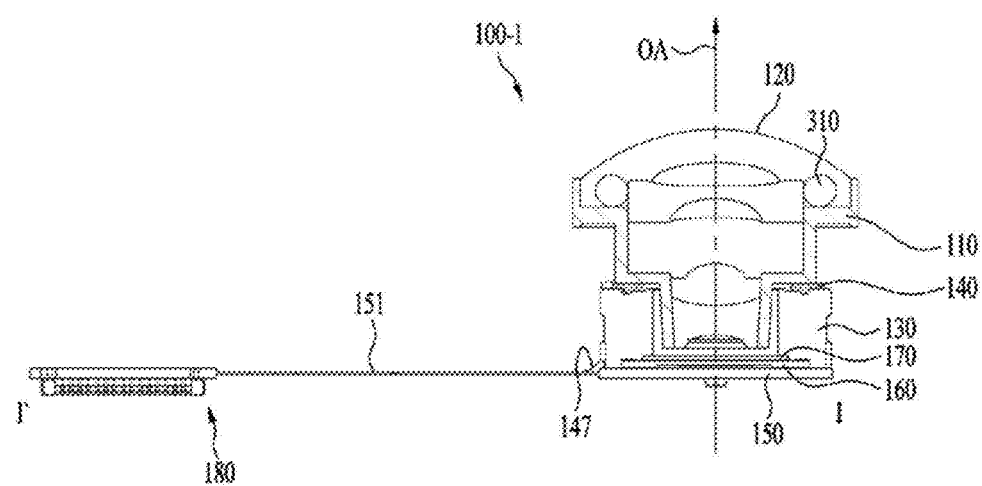
FIG. 19 illustrates a cross-sectional view of a camera module according to another embodiment.

FIG. 19 illustrates a cross-sectional view of a camera module 100-1 according to another embodiment.

Referring to FIG. 19, the camera module 100-1 may correspond to an embodiment in which the retainer 125 and the O-ring 210 are omitted from the camera module 100 described above. In the lens barrel 110 of the camera module 100-1, the screw thread 321 to be fastened with the retainer 125 is omitted.

The description of FIGS. 1 to 18 may be applied to the camera module 100-1 illustrated in FIG. 19, except for the description of the retainer 125 and the O-ring 210.

Figure 20:
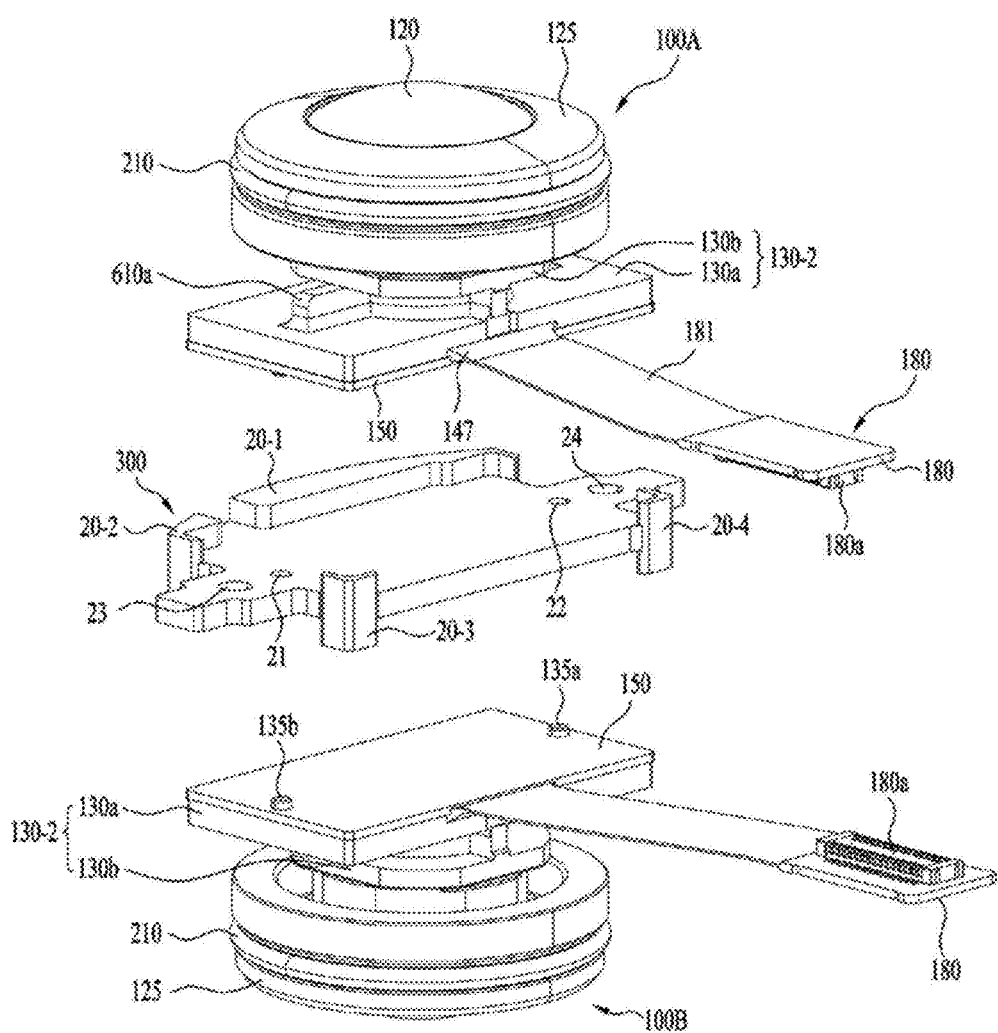
FIG. 20 illustrates a perspective view of a camera module according to another embodiment.

FIG. 20 illustrates a perspective view of a camera module 200 according to another embodiment.

Referring to FIG. 20, the camera module 200 includes a first imaging unit 100A, a second imaging unit 100B, and a bracket 300.

In FIG. 20, each of the first imaging unit 100A and the second imaging unit 110B exemplifies the camera module having the holder 130-2 illustrated in FIG. 14, but is not limited thereto.

In another embodiment, each of the first imaging unit 100A and the second imaging unit 110B may be the camera module 100 according to the embodiments described in FIGS. 1 to 18 or the camera module 100-1 of FIG. 19.

The embodiment may realize a 360-degree view using the first imaging unit 100A having a wide angle and the second imaging unit 100B having a wide angle.

The bracket 300 couples the first imaging unit 100A and the second imaging unit 110B to each other.

For example, the bracket 300 may be coupled to the circuit board 150 of the first imaging unit 100A, and may be coupled to the circuit board 150 of the second imaging unit 110B.

Figure 21A:
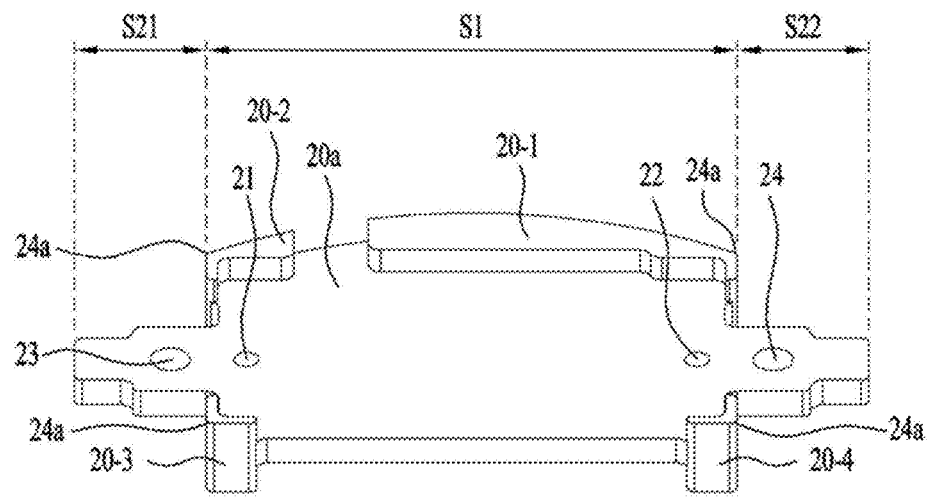
FIG. 21a illustrates a first perspective view of a bracket illustrated in FIG. 20.
Figure 21B:
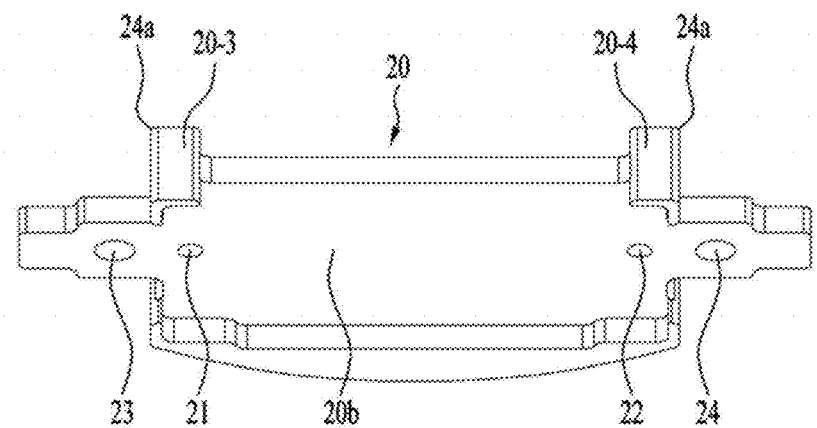
FIG. 21b illustrates a second perspective view of the bracket illustrated in FIG. 20.

FIG. 21a illustrates a first perspective view of the bracket 300 illustrated in FIG. 20, and FIG. 21b illustrates a second perspective view of the bracket 300 illustrated in FIG. 20.

Referring to FIGS. 21a and 21b, the bracket 300 includes a body 20 and guide portions 20-1 to 20-4.

The body 20 includes an upper surface 20a to be coupled to the first imaging unit 100A, a lower surface 20b to be coupled to the second imaging unit 110B, and a side surface 20c located between the upper surface 20a and the lower surface 20b.

The upper surface 20a of the body 20 may face the circuit board 150 of the first imaging unit 100A, and may be brought into contact with the lower surface of the circuit board 150 of the first imaging unit 100A.

The lower surface 20b of the body 20 may face the circuit board 150 of the second imaging unit 100B, and may be brought into contact with the lower surface of the circuit board 150 of the second imaging unit 100A.

The body 20 may include a first area S1, which corresponds to the lower surface of the circuit board 150 of each of the first and second imaging units 100A and 100B, and second areas S21 and S22, which are the remaining area excluding the first area S1.

The first area S1 of the body 20 may be disposed with holes 21 and 22, into which the coupling bosses 135a and 135b disposed on the lower surface of the holder (e.g., 130-2) of the first imaging unit 100A and the coupling bosses 135a and 135b disposed on the lower surface of the holder 130-2 of the second imaging unit 100B are inserted.

For example, the holes 21 and 22 may include a first opening, which is open to the upper surface 20a of the first area S1 of the body 20, and a second opening, which is open to the lower surface 20b of the first area S1 of the body 20.

The coupling bosses 135a and 135b of the holder (e.g., 130-2) of the first imaging unit 100A may pass through the holes 152 and 154 in the circuit board 150 to thereby be inserted into the first opening of the respective holes 21 and 22 in the bracket 300, and the coupling bosses 135a and 135b of the holder (e.g., 130-2) of the second imaging unit 100B may pass through the holes 152 and 154 in the circuit board 150 to thereby be inserted into the second opening of the respective holes 21 and 22 in the bracket 300.

Since the coupling bosses 135a and 1 of the holder (e.g., 130-2) of each of the first and second imaging units 110A and 100B are inserted into the same holes 21 and 22 disposed in the bracket 300, the optical axes (OA in FIG. 1) or the optical centers of the first and second imaging units 110A and 100B may be easily and accurately aligned with each other. This may prevent image distortion that occurs when alignment fails when realizing a 360-degree view.

The guide portions 20-1 to 20-4 are connected to the body 20, and support or guide the circuit boards 150 and the holder (e.g., 130-2) of the first and second imaging units 100A and 100B seated on the first area S1 of the body 20.

For example, the guide portions 20-1 to 20-4 may be in contact with the side surface of the body 20, one end of the respective guide portions 20-1 to 20-4 may protrude from the upper surface 20a of the body 20, and the other end of the respective guide portions 20-1 to 20-4 may protrude from the lower surface 20b of the body 20.

For example, the guide portions 20-1 to 20-4 may be positioned so as to abut the corners of the first area S1 of the body 20, and may respectively include bent portions 24a, which are bent to surround the corners of the first area S1.

For example, the number of guide portions 20-1 to 20-4 may be plural, and each of the plurality of guide portions 20-1 to 20-4 may include the bent portion 24a, which surrounds a corresponding one of the corners of the first area S1.

The side surface of the circuit board 150 of each of the first and second imaging units 100A and 100B may be in contact with the inner side surfaces of the plurality of guide portions 20-1 to 20-4. In addition, the side surface of the body portion 130a of the holder (e.g., 130-2) of each of the first and second imaging units 100A and 100B may be in contact with the inner side surfaces of the plurality of guide portions 20-1 to 20-4.

That is, the plurality of guide portions 20-1 to 20-4 may support or guide the side surface of the circuit board 150 and/or the side surface of the body portion 130a of the holder (e.g., 130-2), thereby being capable of preventing the second imaging units 100A and 100B from being separated from the bracket 300 or preventing deviation of the optical axis or the focal length of the first and second imaging units 100A and 100B.

Each of the second areas S21 and S22 of the body 20 of the bracket 300 may extend in a direction perpendicular to the optical axis from a corresponding end of the first area S1. The second area S21 and S22 of the body 20 may be disposed with holes 23 and 24 for coupling with an external device, for example, an optical device such as a mobile phone.

For example, the second areas S21 and S22 of the body 20 of the bracket 300 may include a second-first area S21, which extends leftwards from one side surface of the first area S1 of the body 20 located between two adjacent guide portions 20-2 and 20-3, and a second-second area S22, which extends rightwards from the other side of the first area S1 of the body 20 located between the other two adjacent guide portions 20-1 and 20-4. The second-first area S21 and the second-second area S22 may be parallel to the first area S1, but the embodiment is not limited thereto.

The bracket 330 may be formed of a metal material, for example, aluminum, copper, or the like, in order to easily withstand the weight of the first and second imaging units 100A and 100B, to protect the first and second imaging units 100A and 100B from external impact, and to easily dissipate heat generated from the image sensor 160 or various elements mounted on the circuit board of the first and second imaging units 100A and 100B.

Figure 22:
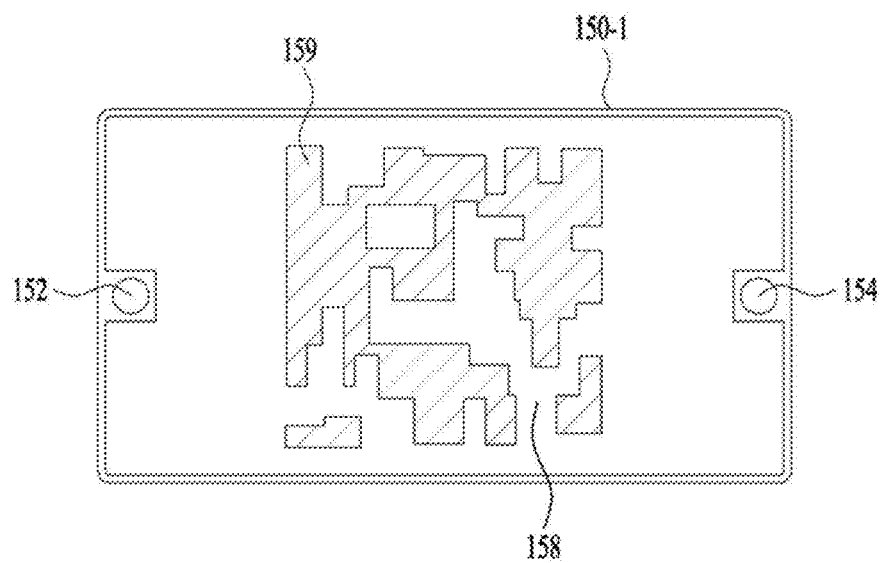
FIG. 22 illustrates a bottom view of another embodiment of a circuit board illustrated in FIG. 20.

FIG. 22 illustrates a bottom view of another embodiment 150-1 of the circuit board illustrated in FIG. 20.

Referring to FIG. 22, the circuit board 150-1 of each of the first and second imaging units 100A and 100B may be a double-sided printed circuit board including an insulating plate and a copper foil or copper wire, and may include a first area 158 and a second area 159.

The first area 158 of the circuit board 150-1 may be an area in which a circuit pattern or a wiring pattern, to which the image sensor 160 and various elements are electrically connected, is formed.

The second area 159 of the circuit board 150-2 may be an area which is not electrically connected to the image sensor 160 and various elements, or an area, which corresponds to a common ground of the image sensor 160 and various elements.

The copper foil in the area 159 of the circuit board 150-1 may be exposed from the lower surface of the circuit board 150-1, which is an insulating plate.

The copper foil of the second area 159 of the circuit board 150-1 exposed from the lower surface of the circuit board 150-1 of the first imaging unit 100A may be in contact with the upper surface of the bracket 300, and the copper foil of the second area 159 of the circuit board 150-1 exposed from the lower surface of the circuit board 150-1 of the second imaging unit 100B may be in contact with the lower surface 20b of the bracket 300.

The copper foil of the first area 158 of the circuit board 150-1 is not exposed from the lower surface of the circuit board 150-1. This is because short-circuiting may occur between the image sensor 160 and various elements when the copper foil of the first area 158 of the circuit board 150-1 is exposed.

Since the image sensors 160 of the first and second imaging units 100A, 100B are positioned adjacent to each other and have a structure in which they are coupled to each other, when the bracket 300 does not easily dissipate the heat generated from the image sensors 160 of the first and second imaging units 100A and 100B, the image sensors and various elements may be subjected to heat damage or may malfunction.

Since the heat generated from the image sensors 160 of the first and second imaging units 100A and 100B is transferred to the bracket 300 through the exposed copper foil of the second area 159 of the circuit board 150-1, the embodiment may enhance thermal conductivity and heat dissipation efficiency.

The circuit board 150-1 of FIG. 22 may be applied to the camera modules 100 and 100-1 according to the embodiments.

In order to enhance thermal conductivity from the image sensors 160 to the bracket 300, a thermally conductive pad or a thermally conductive tape may be additionally disposed between the exposed copper foil of the second area 159 of the circuit board 150-1 and the upper or lower surface of the bracket 300.

Figure 23:
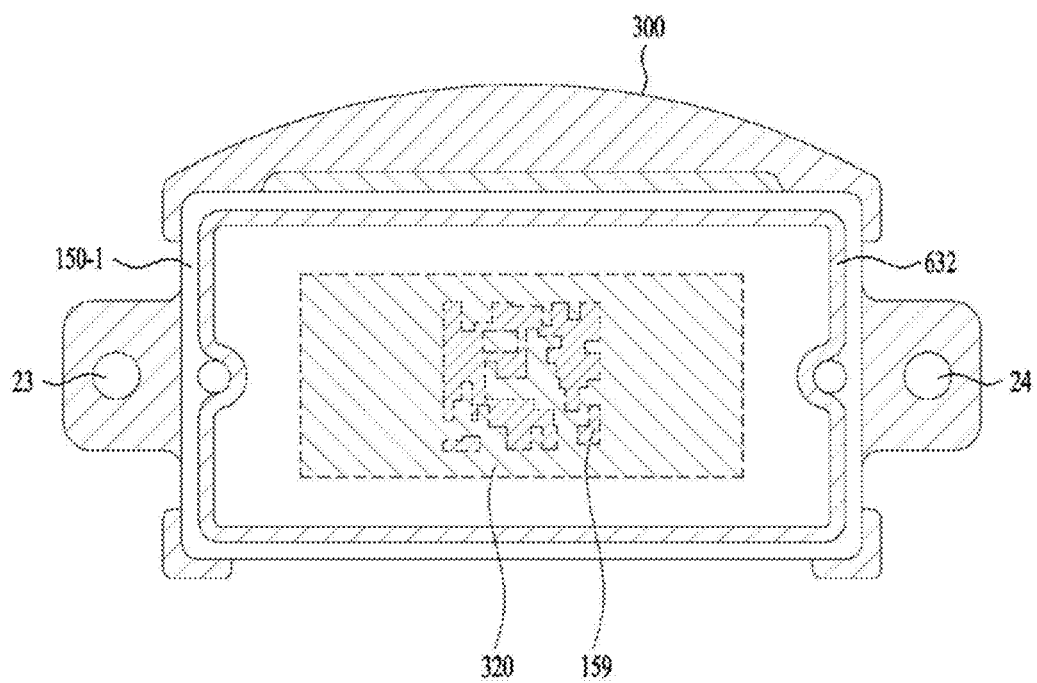
FIG. 23 illustrates a thermally conductive tape according to an embodiment.

FIG. 23 illustrates a thermally conductive tape 320 according to an embodiment.

Referring to FIG. 23, the thermally conductive tape 320 may be disposed between the exposed copper foil of the second area 159 of the circuit board 150-1 of each of the first and second imaging units 100A and 100B and the upper surface 20a or the lower surface 29b of the bracket 300. The thermally conductive tape 320 may enhance the adhesive force between the circuit board 150-1 of each of the first and second imaging units 100A and 100B and the upper surface 20a or the lower surface 20b of the bracket 300 and may enhance thermal conductivity and efficiency of heat dissipation from the image sensor 160 to the bracket 300.

In addition, the thermally conductive tape 320 may be an electrical insulator for electrical insulation between the second area 159 of the circuit board 150-1 exposed from the lower surface of the circuit board 150-1 and the bracket 300.

In addition, the camera module 100 or 100-1 according to the embodiment may be included in an optical instrument, which forms an image of an object in a space using reflection, refraction, absorption, interference, diffraction, or the like, which are characteristics of light, and may have the purpose of increasing visibility to the eyes, of recording and forming an image using a lens, or of performing optical measurement or image propagation or transmission, for example. Examples of the optical instrument according to the embodiment may include a smart phone and a portable terminal equipped with a camera.

Figure 24:
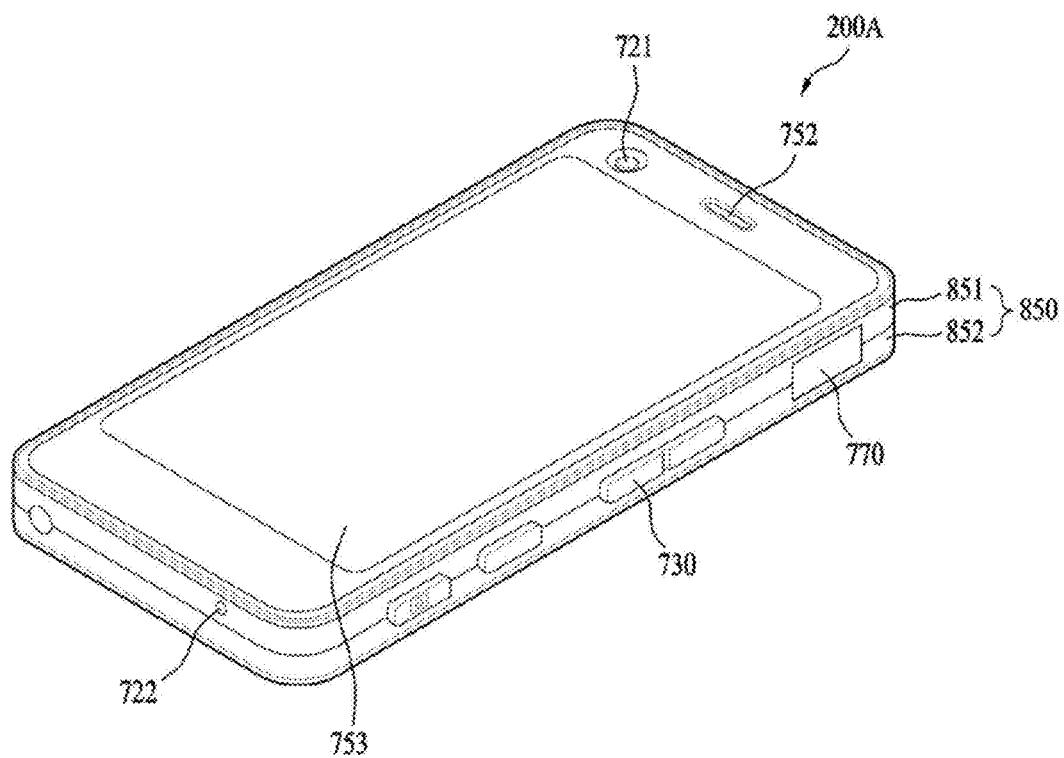
FIG. 24 illustrates a perspective view of a portable terminal according to an embodiment.
Figure 25:
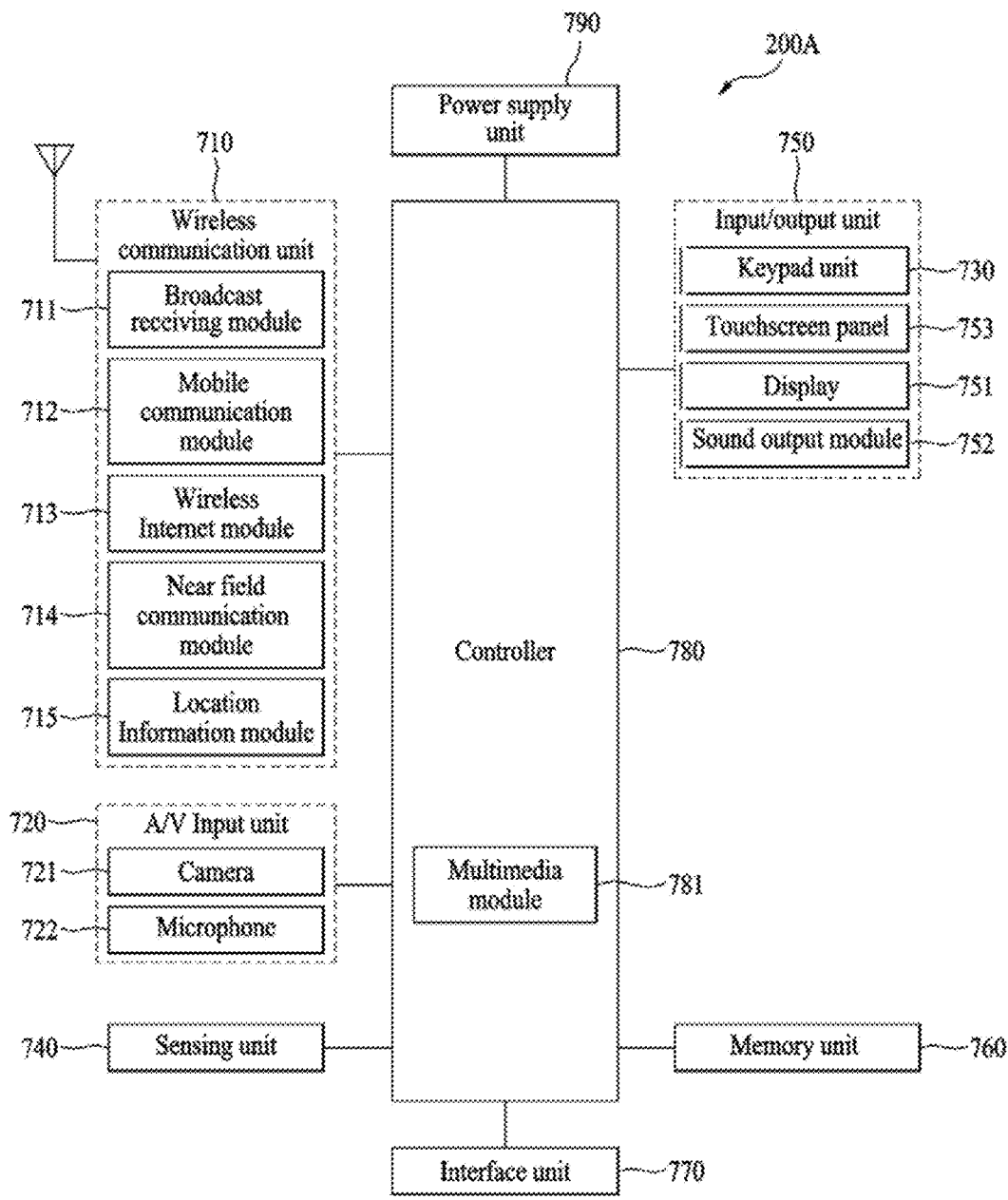
FIG. 25 illustrates a view of the configuration of the portable terminal illustrated in FIG. 24.

FIG. 24 illustrates a perspective view of a portable terminal 200A according to the embodiment, and FIG. 25 illustrates a view of the configuration of the portable terminal illustrated in FIG. 24.

Referring to FIGS. 24 and 25, the portable terminal 200A (hereinafter referred to as "terminal") may include a body 850, a wireless communication unit 710, an A/V input unit 720, a sensing unit 740, an input/output unit 750, a memory 760, an interface unit 770, a controller 780, and a power supply unit 790.

The body 850 illustrated in FIG. 24 has a bar shape, but is not limited thereto. The body may have any of various structures such as a slide type, a folder type, a swing type, or a swivel type, in which two or more sub-bodies are coupled so as to be movable relative to each other.

The body 850 may include a case (e.g., a casing, a housing, or a cover) forming the external appearance thereof. For example, the body 850 may be divided into a front case 851 and a rear case 852. Various electronic components of the terminal may be mounted in the space formed between the front case 851 and the rear case 852.

The wireless communication unit 710 may include one or more modules, which enable wireless communication between the terminal 200A and a wireless communication system or between the terminal 200A and the network in which the terminal 200A is located. For example, the wireless communication unit 710 may include a broadcast receiving module 711, a mobile communication module 712, a wireless Internet module 713, a near field communication module 714, and a location information module 715.

The audio/video (A/V) input unit 720 serves to input an audio signal or a video signal, and may include a camera 721 and a microphone 722.

The camera 721 may be the camera module 100 or 100-1 according to the embodiment.

The sensing unit 740 may sense the current state of the terminal 200A, such as the opening/closing state of the terminal 200A, the position of the terminal 200A, the presence or absence of a user touch, the orientation of the terminal 200A, and the acceleration/deceleration of the terminal 200A, and may generate a sensing signal for controlling the operation of the terminal 200A. For example, when the terminal 200A is in the form of a slide phone, the sensing unit may sense whether the slide phone is opened or closed. In addition, the sensing unit functions to sense whether or not the power supply unit 790 supplies a voltage, or whether or not the interface unit 770 is connected to an external device.

The input/output unit 750 serves to generate input or output related to a visual sense, auditory sense, tactile sense, or the like. The input/output unit 750 may generate input data for controlling the operation of the terminal 200A, and may also display information processed in the terminal 200A.

The input/output unit 750 may include a keypad unit 730, a display module 751, a sound output module 752, and a touchscreen panel 753. The keypad unit 730 may generate input data in response to input made on a keypad.

The display module 751 may include a plurality of pixels, the color of which changes in response to an electric signal. For example, the display module 751 may include at least one selected from among a liquid crystal display, a thin film transistor-liquid crystal display, an organic light-emitting diode, a flexible display, and a three-dimensional display (3D display).

The sound output module 752 may output audio data received from the wireless communication unit 710 in a call signal reception mode, a call mode, a recording mode, a voice recognition mode, a broadcast reception mode, or the like, or may output audio data stored in the memory 760.

The touchscreen panel 753 may convert a change in capacitance caused by a user's touch on a specific area of a touchscreen into an electric input signal.

The memory 760 may store a program for processing and controlling the controller 780, and may temporarily store input/output data (e.g., a telephone directory, messages, audio, still images, photographs, and moving images). For example, the memory 760 may store an image photographed by the camera 721, for example, a photograph or a moving image.

The interface unit 770 serves as a connection path for an external device connected to the terminal 200A. The interface unit 770 receives data from the external device, or receives a voltage and transmits the voltage to each component in the terminal 200A, or allows data in the terminal 200A to be transmitted to the external device. For example, the interface unit 770 may include a wired/wireless headset port, an external charger port, a wired/wireless data port, a memory card port, a port for connecting a device equipped with an identification module, an audio input/output (I/O) port, a video input/output (I/P) port, an earphone port, and the like.

The controller 780 may control the overall operation of the terminal 200A. For example, the controller 780 may perform related control and processing for voice call, data communication, video call, and the like. The controller 780 may include a multimedia module 781 for multimedia playback.

The controller 780 may perform a pattern recognition process for recognizing handwriting input or drawing input performed on the touchscreen as characters and images, respectively.

The power supply unit 790 may supply external power or internal power according to the control of the controller 780, and may supply the voltage required for the operation of the respective components.

The above described features, configurations, effects, and the like are included in at least one of the embodiments, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the embodiments as disclosed in the accompanying claims.

INDUSTRIAL APPLICABILITY

Embodiments may be used for a camera module, which enables active alignment of a lens array unit and is capable of preventing the lens array unit from being out of focus, and an optical apparatus including the camera module.

The invention claimed is:

1. A camera module comprising:
a lens barrel comprising a protrusion on a lower surface thereof;
a lens array including a plurality of lenses;
a holder comprising a through-hole into which the protrusion of the lens barrel is inserted;
a first adhesive member disposed between the lens barrel and the holder;
an image sensor disposed under the through-hole;
a retainer coupled to an upper end of the lens barrel and fixing the lens array;
a first O-ring disposed on an outer circumferential surface of the retainer; and
a reinforcement adhesive member disposed between the retainer and the lens barrel,
wherein an outer circumferential surface of the protrusion inserted into the through-hole is spaced apart from an inner circumferential surface of the through-hole,
wherein the lens barrel comprises a plurality of seating portions defining hollow regions having different diameters, and the lens array is disposed on the plurality of seating portions,
wherein the retainer comprises:
an engaging portion coupled to an outer circumferential surface of an uppermost seating portion among the plurality of seating portions of the lens barrel;
a bent portion bent from the engaging portion to support an edge of a first lens of the plurality of lenses; and
a ring-shaped groove formed in the outer circumferential surface of the retainer,
wherein the first O-ring is seated in the ring-shaped groove, and
wherein the reinforcement adhesive member is disposed to cover a lowermost surface of the uppermost seating portion and a portion of the engaging portion.

2. The camera module according to claim 1, wherein the first adhesive member is disposed between the lower surface of the lens barrel around the protrusion and an upper surface of the holder around the through-hole.

3. The camera module according to claim 1, wherein the retainer is in contact with an uppermost lens among the plurality of lenses.

4. The camera module according to claim 1, wherein a screw thread for fastening is formed in each of the uppermost seating portion of the lens barrel and the engaging portion.

5. The camera module according to claim 3, wherein the uppermost lens has the largest diameter among the plurality of lenses.

6. The camera module according to claim 3, wherein the uppermost lens has an exit surface which is upwardly convex.

7. The camera module according to claim 1, wherein an upper end of the bent portion is located higher than an upper end of the lens barrel.

8. The camera module according to claim 6, wherein the exit surface of the uppermost lens protrudes out of the bent portion.

9. The camera module according to claim 1, comprising a second O-ring disposed between one of the plurality of seating portions and the lens array.

10. The camera module according to claim 9, wherein the second O-ring is disposed between a first seating portion of the plurality of seating portions and the first lens of the plurality of lenses,
wherein the first seating portion is located on an uppermost side of the plurality of seating portions, and
wherein the first lens is located on an uppermost side of the plurality lenses.

11. The camera module according to claim 1, wherein the protrusion is spaced apart from an inner circumference surface of the through-hole.

12. The camera module according to claim 1, wherein a first screw thread is disposed on an outer circumference surface of the uppermost seating portion, and
 wherein the engaging portion comprises a second screw disposed on an inner circumference surface thereof to engage with the first screw thread.

13. The camera module according to claim 12, wherein the reinforcement adhesive member is in contact with lower ends of the first and second screw threads.

14. The camera module according to claim 1, wherein the reinforcement adhesive member is formed by an epoxy.

15. The camera module according to claim 1, wherein the reinforcement adhesive member is configured to prevent separation or distortion of the retainer and the lens barrel.

* * * * *